United States Patent [19]

Furtado et al.

[11] Patent Number: 5,049,079

[45] Date of Patent: Sep. 17, 1991

[54] CLOSED LOOP SKI SIMULATION AND INSTRUCTIONAL SYSTEM

[75] Inventors: Matthew P. Furtado, 1430 Montclaire Place, Los Altos, Calif. 94022; John H. Peterson, 834 A Green St., San Francisco, Calif. 94133

[73] Assignee: John H. Peterson, San Francisco, Calif.

[21] Appl. No.: 286,764

[22] Filed: Dec. 19, 1988

[51] Int. Cl.[5] .............................................. A63B 69/18
[52] U.S. Cl. .................................... 434/253; 272/97; 272/146
[58] Field of Search .................. 434/253; 272/97, 146, 272/56.5 SS, 129; 273/DIG. 28, 148 B

[56] References Cited

U.S. PATENT DOCUMENTS

| 2,815,951 | 12/1957 | Baldanza | 434/253 |
|---|---|---|---|
| 2,969,060 | 3/1961 | Swanda et al. | 272/97 |
| 3,408,067 | 10/1968 | Armstrong . | |
| 3,791,645 | 2/1974 | Stelma | 434/253 |
| 3,807,727 | 4/1974 | Ferguson . | |
| 3,912,260 | 1/1975 | Rice | 272/97 |
| 4,074,903 | 2/1978 | Diez de Aux . | |
| 4,092,787 | 5/1978 | Kaempfen | 272/97 |
| 4,396,189 | 8/1983 | Jenkins | 272/97 |
| 4,398,189 | 8/1983 | Pasierb, Jr. et al. . | |
| 4,488,017 | 12/1984 | Lee | 273/148 B |
| 4,490,810 | 12/1984 | Hon . | |
| 4,629,171 | 12/1986 | Judy et al. . | |
| 4,629,181 | 12/1986 | Krive | 272/97 |
| 4,709,917 | 12/1987 | Yang | 272/129 |
| 4,720,789 | 1/1988 | Hector et al. | 273/148 B |
| 4,817,950 | 4/1989 | Goo | 273/148 B |
| 4,906,192 | 3/1990 | Smithard et al. | 434/253 |

FOREIGN PATENT DOCUMENTS

| 275665 | of 1988 | European Pat. Off. | 272/97 |
|---|---|---|---|
| 2822343 | 11/1979 | Fed. Rep. of Germany | 272/129 |

OTHER PUBLICATIONS

"Increase Your Collection-Slalom" advertisement from Playmeter, 1/15/87, p. 111.

Primary Examiner—William H. Grieb
Attorney, Agent, or Firm—Limbach, Limbach & Sutton

[57] ABSTRACT

A closed-loop user interactive ski simulation system with a foot controlled ski input device is disclosed. The system includes a pair of skis and pressure sensors in association with the skis. The sensors generate an output voltage in response to force applied by a user to the skis. The output voltage is converted to digital format and fed into a computer that processes the information and provides a drive signal. The drive signal may be used to control a display system, a motion simulation system or both. The simulation system can be used for instructional purposes as well as for training, entertainment and exercise.

46 Claims, 19 Drawing Sheets

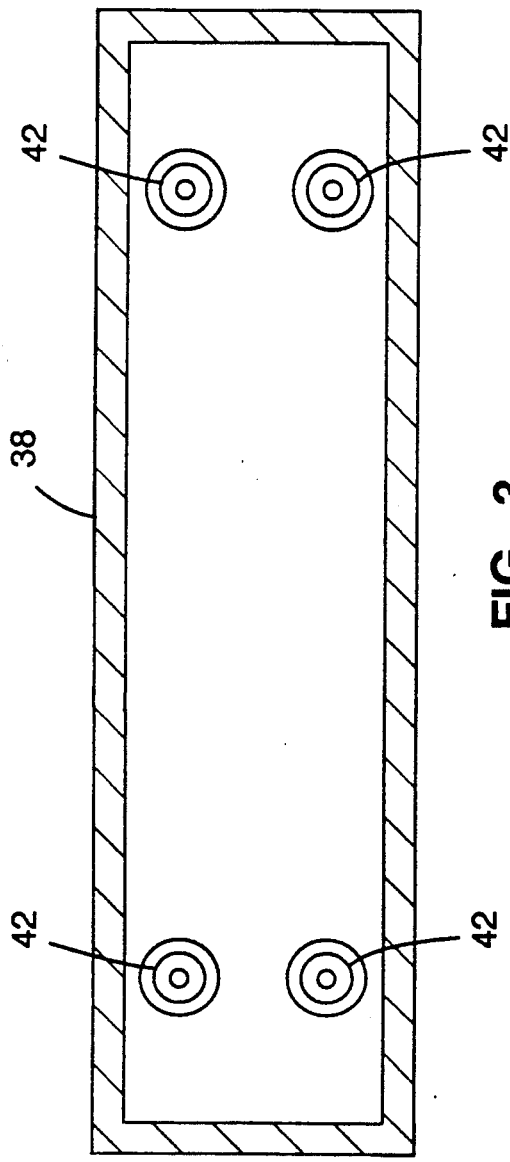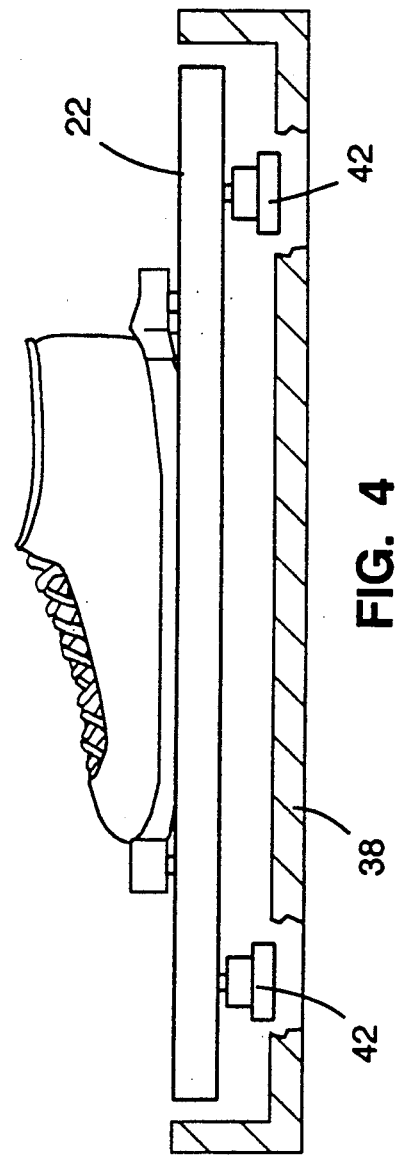

VERTICAL FORCE
FOOT SENSOR DIAGRAM

V1 - V8 = VERTICAL FORCE GAGES

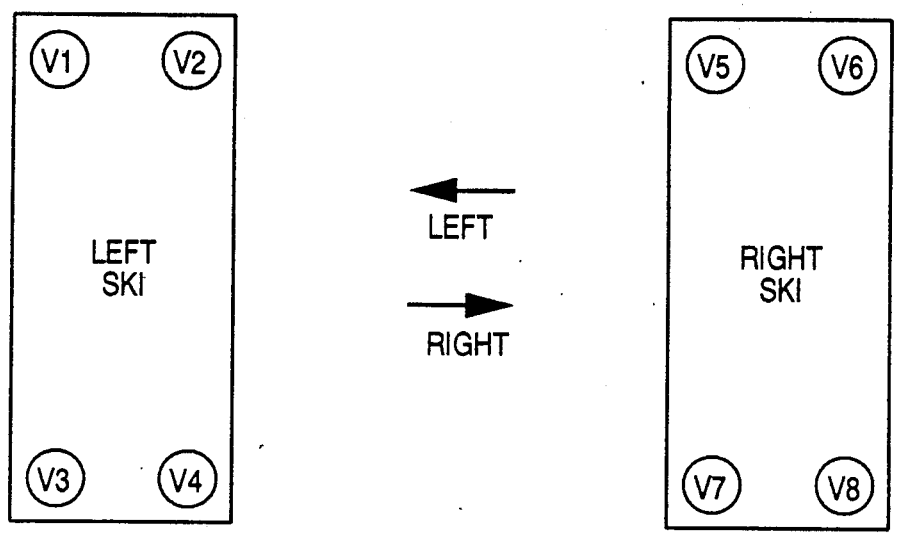

WEIGHT CALCULATIONS ( HERE THE VARIABLES REPRESENT THE FORCES APPLIED TO EACH GAGE, NOT THE GAGE NAME )

TOTAL WEIGHT = V1 + V2 + V3 + V4 + V5 + V6 + V7 + V8

LEFT SKI:
   TOTAL SKI WEIGHTING = V1 + V2 + V3 + V4
   FORE PRESSURE = V1 + V2
   AFT PRESSURE = V3 + V4

RIGHT SKI:
   TOTAL SKI WEIGHTING = V5 + V6 + V7 + V8
   FORE PRESSURE = V5 + V6
   AFT PRESSURE = V7 + V8

EDGE DETECTION AND CALCULATION      FIG. 5A

LEFT SKI:
   LEFT EDGE = V1 + V3
   RIGHT EDGE = V2 + V4

RIGHT SKI:
   LEFT EDGE = V5 + V7
   RIGHT EDGE = V6 + V8

FOOT SENSOR DIAGRAM

L1 - L8 = LATERAL FORCE GAGES

WEIGHT CALCULATIONS ( HERE THE VARIABLES REPRESENT THE FORCES APPLIED TO EACH GAGE, NOT THE GAGE NAME )

PIVOTTING DETECTION

LEFT SKI:
 LEFT PIVOT = ( L1 + L4 ) − ( L2 + L3 )
 RIGHT PIVOT = ( L2 + L3 ) − ( L1 + L4 )

RIGHT SKI:
 LEFT PIVOT = ( L5 + L8 ) − ( L6 + L7 )
 RIGHT PIVOT = ( L6 + L7 ) − ( L5 + L8 )

OVERALL CONTROL LOOP SCHEMATIC

DETAIL OF INPUT SAMPLING

DETAIL OF PHYSICAL CALCULATIONS AND MOVEMENT SIMULATION

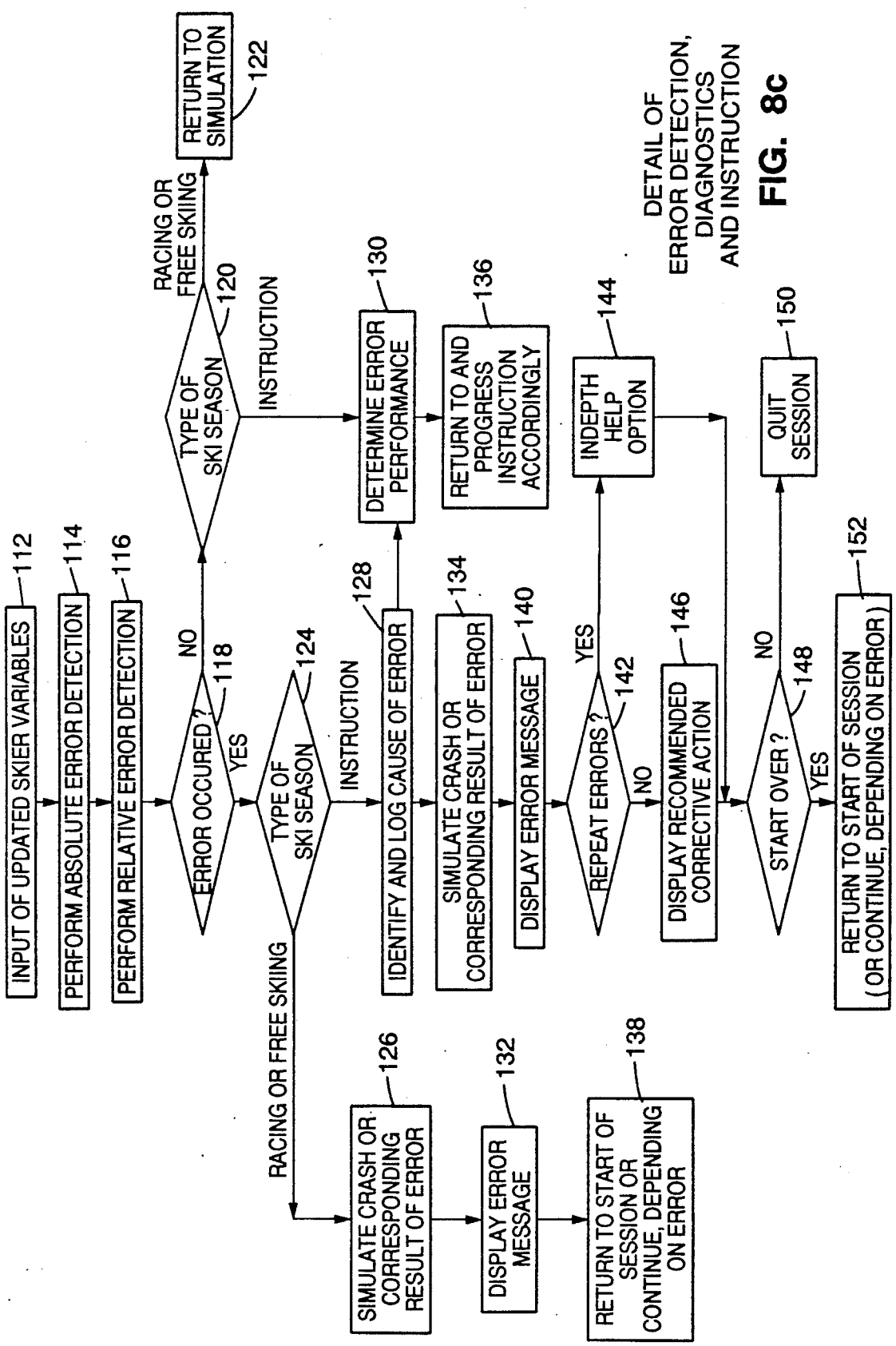

SKI DEFLECTION AND RADIUS CALCS

F = APPIED FORCE DUE TO WEIGHTING

Xw = POINT OF CONCENTRATED FORCE APPLICATION d = DEFLECTION OF SKI DUE TO WEIGHTING

R = RADIUS OF CURVATURE OF SKI DUE TO DEFLECTION

L = LENGTH OF SKI 254
270

40

CLOSED LOOP SKI SIMULATION AND INSTRUCTIONAL SYSTEM

TECHNICAL FIELD

The present invention relates generally to simulators and, more specifically, to a user interactive ski simulation system.

BACKGROUND OF THE INVENTION

Introducing skiing to beginners in a naturally hostile environment, the ski slopes, takes its toll both on the student and on ski instruction. That is, before beginners can be taught to ski, they must be taught how to remain upright on their skis. Thus, straight-forward, clear and uncompromised skiing fundamentals generally cannot be taught. On the contrary, to insure that they can instantly assimilate and execute skills introduced just moments earlier, while on their skis, students worldwide are taught a series of progressional techniques or transitional turns that are neither completely succinct nor fundamentally correct. These transitional learning steps are incorporated into the instruction to insure that the common skier can stay on his feet and in control long enough to practice and learn installments of the critical ski skill information.

A number of serious consequences arise from this approach. First, many students cannot discern the insignificant lesson information used as a tool to keep them on their feet from the valuable underlying turning fundamentals to be retained. Second, because of the extent of the transitional emphasis, many ski students ironically walk away from their instruction retaining and basing their technical understanding of skiing on the transitional techniques, e.g. repositioning skis, while forgetting the essential knowledge they were propped up to learn, i.e., the fundamental skills which utilize the turning properties of modern skis to produce the actual turning arcs. A third major consequence is increased time expenditure. To learn and unlearn a variety of transitional techniques significantly prolongs the learning processes. The amount of information presented and the skills to be mastered are quite possibly doubled.

Conventional ski instructional systems do not attempt, nor are they equipped to implement, a new progressional format for ski instruction. More specifically, prior systems are not equipped to institute a significant, and certainly not a total, elimination of transitional techniques, such as beginning novices straight in a parallel stance, to learn uncompromising carving fundamentals. Second, and more importantly, no prior system is equipped to provide the student with an effective interactive environment in which to experience and practice, to a desired degree of competence, a proposed streamlined and uncompromised learning format.

Each manually-controlled physical turn simulation mechanism found in the prior art effectively disqualifies itself from any serious progressional ski instruction role. While a few prior art simulators do allow for the low end conventional transitional movements of skiing (snow plow, christie, etc.), none teaches toward the high end and simulates the goal of every skier: carving.

Carving is the turning action whereby the tail of the ski follows through the same groove cut by its tip to produce an unskidded turning arc. Skidding, the technique taught by conventional systems, is the turning action whereby the tails of the skis do not follow the tips but, rather, washout; that is, the skis are pivoted or forced to slide around the tips in a lateral skidding fashion. To put these two techniques into historical perspective, carving superseded skidding as the racers' choice in the early 60's and a quarter century later is no longer considered a technique exclusive to racing but, rather, is today's standard of effective skiing.

A skier produces a carved turn by setting the ski on varying degrees of edge and pressuring down on the ski to varying degrees. Dependant upon its own particular design and construction, the ski responds by bending into reversed arc corresponding to applied input, ski design and ski-to-snow interaction. With the entire edge passing through the same groove, the ski carves a turning radius determined by the ski's reverse curvature edged into the snow. The critical point is, that although the skier applies the carving input on the ski, it is the ski's own design and turning characteristics that, through edge and deflection, carve the turn radius. Thus, the ski changes its own heading direction.

All known ski simulators, on the other hand, rely on the user to manually change the heading direction of the skis. The user must physically pivot his simulated skis around a horizontal rotational axis, totally eliminating the possibility of simulating the carving action.

For example, the mechanisms disclosed in U.S. Pat. No. 3,807,727 to Ferguson and U.S. Pat. No. 4,396,189 to Jenkins both rely upon the positioning of their horizontal rotational axis ahead of the toe supports. Thus, the tails of the user's skis cannot possibly follow the ski tips path, but are locked unconditionally into swinging laterally around the tips, forcing the user into the unconditional execution of skidding techniques.

Other prior art ski simulators such as disclosed in U.S. Pat. No. 4,629,171 to Krive, utilize a manually rotated platform to simulate turning motion. Although the rotational axis is better positioned than in the case of the Ferguson or Jenkins devices, being placed between the feet, manually operated platforms such as this "condition in" more extreme skidding behavior. To turn or rotate Krive's platform requires user-conscious foot rotation, e.g. "heel-thrust", "rotation", "counter-rotation", all old and well-established skidding techniques. Correct carving technique, i.e. edging and vertical pressuring, will, not generate rotation or turning simulation from such a device.

Plainly, the basis of these prior systems, which is the direct translation of manual pivoting into proportionate rotation, effected on a free-turning mechanism, cannot simulate non-rotational input techniques that utilize the skis' own turning properties to produce the turning output.

First, on the most basic level, if carving input could produce rotation, without some internal/external means of regulating rotational speed, the skis could easily be rotated in a rapid skid-simulating fashion of tails spinning around tips, particularly in an exercise mode of operation. More importantly, without some internal/external means of compensating for the skis actual turning response, or more precisely, without some means of translating the skis' carving-rotational response or output from non- rotational, vertically-applied carving input, there can be no true relationship between carving input and the rotational output.

In contrast, the present invention provides a mechanism that does include physical simulation of the ski's turning action. The invention's physical output mechanism, which physically simulates ski movement, is "modulized" from input devices and controlled by the intervening computational and signal generation functions of a computer system.

In this way, the computer translates non-rotational carving input into accurate turning/carving output by mathematically modeling the event. The computer determines, for similar on-slope conditions, what the user's skis' actual and continuous turning response would be from continuously transmitted inputs. The skis will turn corresponding to the modeled event by constantly updated position command signals generated by the computer and a modulized physical movement mechanism. Beyond true carving simulation, true carving exercise is also provided in this fashion.

Modulization begins with foot-controlled input devices. The input devices in themselves provide no turning-movement simulation. They are strictly input devices, sensing and transmitting to the computer for modeling purposes all the dynamic forces and torques applied to the skis.

An input device not related to skiing, but designed to control video games, is described by Lee in U.S. Pat. No. 4,488,017. Essentially, Lee's controller is a foot-controlled joystick that is straddled by the user. The user positions each foot on either side of the single control unit and, instead of hand manipulation of the joystick, the shifting of the user's weight in the desired direction tilts and aims the joystick element in the desired direction.

Certainly, a skier executing the basis of joystick control and aiming his weight shift in the direction he desires to go will not induce his skis to move him in that direction. No substantial ski-related input information can be generated, sensed and transmitted for ski/carving simulation purposes with Lee's controller. Specifically, although the Lee control unit does tilt to a minimal degree to make electrical contact and produce a directional signal, no effective edging input can be reproduced in this fashion. No inward tilt, no edging with the two inside edges, which are the two essential edges to turn the skis, can be effected by the user and sensed by the controller.

More critically, even though the Lee controller may be pressure activated, it does not differentiate between varying degrees of pressure. It's output signal does not change in proportion to the change in input pressure. Therefore, no evaluation by the computer of those forces which bend the skis into varying curvatures is possible. Weighing and generating varying quantities of weight/force on a ski to bend it into varying reverse curvatures to carve various turn radii is the essence of carving turns. When a skier wants to make sharper turns, he applies more force, sharpening the skis reverse curvature and, thus, sharpening the turn radius.

Furthermore, no evaluation of torque, or of varying degrees of torque is possible with the Lee unit. In contrast, torque is sensed by the input mechanism of the subject invention primarily to detect carving errors. Thus, if the user is twisting one or both feet, this activity cannot be sensed by Lee's device and valuable, possible skid, fall or recovery generating input information is not transmitted to the computer.

In brief, the directional heading of a ski will not turn a ski. It is the forces and torques applied to the ski which turn the ski. Therefore, control units based on positioning a control element in a particular direction and then transmitting a directional signal based on the control elements directional orientation cannot be effective in transmitting pertinent ski input information to a computer; not if carving is to be simulated.

When in contact with the snow, a ski, because of its own external and internal design and flex characteristics, responds to varying forces and torques applied by the user and produces predictable movement on the snow. For the computer to mathematically model and simulate the skis' predictable directional responses, it must process variable measurements of those forces and torques applied to the "skis". Therefore, the input devices must be designed and equipped to continuously present the computer with these variable force and torque measurements.

To alleviate possible confusion, edging in this context is the force application where hip and knee angulation, accompanied with skier's applied weight, provides precise leveraging force to drive the ski edge into the snow to varying degrees and to sustain the particular edge angle driven into the snow.

Referring back to the physical movement mechanism of the present invention, after the computer receives the input values and mathematically determines the skis turning response under similar on-slope conditions, it outputs the response in the form of command signals to the physical movement mechanism. The modeling process can also determine that the skis, beyond carving or skidding various speed and turn radii, because of errant input, will "jet out" from under a skier in some particular fashion. This movement as well would be executed by the physical movement system.

Prior computer controlled vehicular motion simulators, precisely because of their effectiveness in fulfilling their objectives of accurately simulating vehicular motion, are not effective in simulating a skier's motion.

Vehicles, in particular motor vehicles, possess input mechanisms that are completely different from their own output mechanisms. Thus, vehicle simulators provide a separate control loading system, which produces the correct "feel" of input control, and a separate motion system that produces the correct output "motion".

In vehicular terms, a skier's skis, on the other hand, like an ice skater's ice skates, are both the input control device and the movement-producing output device.

What this translates to for a skier, and what a ski simulator must focus on, is that when a skier is skiing, his upper body objective is to stay motionless and all but square to the hill, applying weight and input to skis which, hopefully, are carving left and right arcs, rotating—like a steering wheel—under the upper body's control, and providing the interactive control feedback or "feel" that a steering wheel provides. But, because the skier is standing on the skis, this control feel is also "motion". They are inseparable.

Therefore, a skier is not seated and strapped in a moving compartment to work the input device with ease. Rather, the skier essentially balances on and is strapped to a pair of hybrid input-output devices. With one wrong move, the skier can lose all balance and control. This action is instantly transmitted as out-of-balance, out-of-control input. This causes not only positional and heading havoc, a result of the input function, but the skis charge out from under skier in unrestricted movement which is a result of the skis' output function. This, in turn, causes the user to apply more dramatic inadvertent input to the skis which respond with more dramatic output. This vicious circle has no parallel in the vehicular or vehicular motion simulation world.

Again, in vehicular motion simulators, drivers/pilots are optimally strapped in to apply unhampered input and are optimally buffered from the resulting output to continue applying unhampered input. This interaction is perfectly defined: a control "feel". With skiers, on the other hand, this interaction can lead to a complete loss of control/balance. A skier is not seated within the vehicle being transported; he has simply strapped onto his feet a pair of sophisticated "runners" or skis and must control and face the consequences of losing control/balance while balancing on such elaborate foot attire.

The present invention, with its unique movement axes, attempts to simulates this unique sport. With further reading, the need for the present invention's motion control axes and the lack of utility of prior vehicular control and motion axes will become more apparent.

It is because of ski manufacturing breakthroughs begun during the 1950's that ski technique today is based primarily on the skis' own turning properties to do the turning. The human element is now relegated to standing the most natural way over both skis to edge and flex the control ski into the desired reverse arc. Unfortunately for the student skier, the downside of this natural biomechanical efficiency and ski-oriented technique is that it is visually bankrupt. Novices' eyes cannot discern from those instructors and experts they wish to emulate any relevant visual information beyond a misleading parallel stance. The instructor's technique or body movement will not readily divulge if he is weighing only one ski, the specific ski, where the pressure is being placed (fore, center, or aft), the timing and the degree of edging and weighing, etc. The essence of modern ski technique is all but invisible to the naked eye. This is another major on-slope instruction problem that the simulation instructional system of the present invention attempts to resolve. These internal dynamics must be visually represented in proportion to their importance.

Equally important is the instructor's lack of ability to discern where his students are specifically applying pressure and torque throughout each turn. Students can shift great quantities of weight to the wrong ski, or portion of a ski, without apparent body movement, sending their skis and themselves off into varying degrees of difficulty and leaving their instructor unable to diagnose the problem.

Therefore, those essential, but oftentimes imperceptible, applied forces which the subject invention evaluates toward finding their effect on the skis and the effect of skis to snow, to output and simulate in real time accurate skier motion, can also be evaluated to output and simulate skier's errors, as well as to diagnose and suggest appropriate corrective action to be taken after the errors have been committed.

Simulators such as those disclosed in Laughlin Armstrong's U.S. Pat. No. 4,398,189 and Krive's U.S. Pat. No. 4,629,181, that only sense and transmit information about body position and movement and/or results of body position and movement, cannot detect for diagnostic purposes those specific quantitative forces applied to the skis which send the skiers off into various difficulties. Second, by not placing skis into the equation and, thus, eliminating the most important factor of skiing, not enough information can be attained and transmitted for a computer program to produce an effective numerical representation of the user's carving/skiing output. More specifically, an input device without transmitting those variable forces and torque measurements that a user applies and generates on the skis and the skis generate into the snow through a turn, and do so in a continuous fashion, a real time computational model of the skis and, thus, the users' directional or turning output, cannot be performed. Because no effective direction heading can be mathematically modeled for simulation purposes (again without measuring a vertical force applied to the skis skidding as well as carving is also non-determinable), the system cannot feed back the critical information that a skier uses as the basis for applying an input. The basis of a heading control sport is reading ahead, using environmental feedback to determine how one's inputs and outputs will and do effect attaining a desired heading.

What information the body position sensing systems can and do relay back to the user is his body position performance. In recent ski history, body position was paramount to the recreational skier. Effecting exaggerated body position for stylistic concerns (which hampered actual skiing control and, thus, much opportunity to look stylistic) was to many recreation skiers the major objective. However, in present day skiing, where style is based upon effective and precise heading control, effecting body positions or a series of body positions is a standard instructional rule of what not to do.

Concentrating on body position as an end in itself freezes skiers into posing, into concentrating on their body positions and not coordinating their responses to the environmental circumstances at hand. Prior art ski simulators compound this by urging users, while they are "skiing", to concentrate on and decipher light emitters which signify a different on/off body movement performed by the user. In the day where body movement/position is not a true measure of skier performance, nor a true barometer of what forces will be generated on the skis, and on skis to snow, this approach is both misleading and ineffective. Concentrating on the forces, not on the positions, that the body can generate on the skis or, more precisely, concentrating exclusively on applying those forces on the skis and reading their effect on the slope, is what produces effective heading control skiing. This is what the subject invention attempts to convey and present to the student user.

Film projection display systems, such as described by Armstrong in U.S. Pat. No. 3,408,067 or Diez de Aux, in U.S. Pat. No. 4,074,903 are both completely "open loop". The user's skiing inputs and outputs cause no corresponding change in the predetermined display scenery. Therefore, the user, not being in the loop, cannot see the results of his action. The user cannot use his visual senses to read back from the displayed scenery where his output is taking him and to make judgments on how best to respond with further inputs.

The Health interactive instruction system described by Hon in U.S. Pat. No. 4,490,810, though a closed loop system, is not a closed loop simulator. Correct or incorrect input on a mannequin will trigger either a video disk, computer generated text or audio instruction. However, the student never directly sees or feels the results of his action. The student's input triggers an eventual third person video lesson or second person computer evaluation, but no first person simulation. This is not effective for the instruction and learning of skiing.

Even when a skier standing at rest, has not, but is about to make his first ski-related movement, his movement will be in response to or must take into account his first person on-slope position, heading, lack of motion and position over skis. Once he begins moving, and the faster he moves, and/or the faster he initiates changes in his heading, the more intense must be his concentration in the unbroken flow of feedback information. Now in the loop, all factors begin changing in response to his inputs. Attempting a direction change while moving at speeds of 20–40 miles per hour, with his position changing approximately 30–60 feet per second, what is proper input one moment generally is not the next.

As any beginning student driver can attest, it is a little more than a wild guess as to the correct degree he must turn the steering wheel and apply the brakes to get him in and out of a turn in the desired fashion. Virtually every new student finds he has miscalculated in some fashion (e.g. heading for yellow line/curb), and must correct the wheel, let up or press down on the accelerator. An instant later, he finds he has over-corrected.

However, a skier, unlike a car, does not possess the immediate control of brakes, accelerator and transmission. A skier controls only his direction heading as he "coasts" down a hill. With such lack of control, a skier could be likened to a runaway car and must plan well ahead as to where his direction is taking him. For, indeed, it is only through controlling the direction heading of his skis that a skier can control his speed.

This brings us to another foot controlled bending-beam which produces "carved" turn movement: a skate board. The subject invention also pertains to skateboards. Applied pressure and edge will bend a skateboard and torque the front and/or rear wheels into various turn-angles that, in association, will scribe various "carved" turn radii on the pavement during downhill runs.

In fact, downhill skateboarding is more dependant upon directional control to control speed. On a downhill run, a moments lapse in feedback concentration and application of a directional control will very quickly allow a skateboarder's speed to rise to such a degree that no further direction change is possible—all turns would be too sharp. A skier can at least pivot and skid his skis to a halt, but only hard pavement and a probable crash will await and punctuate a downhill skateboarder's lapse in directional control. In fact, skidding-out in any phase of a turn will cause a downhill skateboarder to crash or bail out.

Therefore, it is the "line", projecting well ahead, and controlling the carved-arc line that is all important to "bending-beam" travel. Though cerebral decision-making may read the environmental feedback to determine the best arc line to take, whether that be deciding where best to free ski a series of arcs or "S" turns, or for racers, determining the best round line through the gates, for any effectiveness, it is almost entirely the unconscious action of the cerebellum that must execute the will. The cerebellum must project forward and apply the precise degree of edge and pressure needed to produce the edged-curvature of the ski that would mirror in degree the curved-line, i.e. the giant radius, it must scribe in the snow to replicate the specific round arced-line of prior decision making. Intellectualizing the precise degree of pressure and edge needed for any one moment, e.g. 120 lbs. at 42 degrees, is not possible. Nor would it be possible to consciously implement these exact force measurements.

In fact, to control a similar but lesser motor act, walking, and consciously direct or think through as much of the motor action as possible, makes for very slow and affected walking, reminiscent of a toddler learning to walk or a stiffly-skiing beginner trying to consciously think his untrained muscles through to each skill execution. It is only through active participation, execution with direct feedback, that the learning process can begin to take shape and then be honed to a level of some involuntary skill before a degree of proficiency can be attained.

No matter how much an instructional system can "show", "tell" and "coach" the skiing student unless the student himself is allowed to see and feel the direct results of his own skiing actions in an accurate closed loop environment (not be told indirectly how he did) to cultivate this interaction, hone these heading control, bending beam skills of a heading control bending beam sport, then there is no reason to apply input and interact with such a system.

The essential ingredient of learning to ski is seeing and feeling the direct results of one's inputs in an accurate environment to cultivate this interaction into effective motor skill execution.

However, this brings us back to square one. Simulating the accurate skiing environment in which to experience the likely feedback that a beginner receives back from the slopes would mean the beginning student could not be taught straight carving fundamentals. On-slope feedback is unmerciful to new skiers.

This is precisely what inspired the conception of the present invention. The entire system is devised around, first, circumventing the unforgiving nature and influence that on-slope skiing has over both the student and his instruction. Second, the thrust of the present invention is aimed at teaching novices in a parallel stance the straight carving fundamentals.

Rather than making the student learn and progress through a variety of transitional ski techniques, the present invention progresses the ski environment through levels of instructional or transitional "realities." This is more conducive to learning in general and specifically allows the student to learn and hone the one objective, i.e. carving technique, in parallel, throughout his education.

The subject method is analogous to the transitional procedure employed by bicycling "students". Beginner and intermediate bicyclists are supplied with transitional bikes. Because of the added lateral support they do supply, transitional bikes "weight" the effect that balance and balance-errors have on the beginner and intermediate riders and, thus, alter the "real world" conditions that a true two-wheeler cyclist experiences. The conditions are altered to keep the student upright and practicing a less exacting motor skill procedure—without altering the skill procedure. This is the objective.

A cyclist can simply get on and ride (pedal and steer) a tricycle, a training-wheel equipped bicycle and then a straight bicycle. He does not have to bow to the elements and become mired in learning and unlearning a variety of different riding techniques to stay up and in control, as does a student skier.

Hence, the primary instructional objective of the system is not to mirror on-slope instruction, but quite the contrary, to take on the transitional burden, as transitional bikes do, and eliminate much instruction practice time and confusion. This is accomplished by altering the simulator's replication of the real world ski environment, again in the same fashion transitional bikes alter their replication of the real world bicycling environment, to allow the student to stay up and practice the most simplistic carving procedure without diverging from carving procedure. The next step is to slowly raise the environmental conditions to real world specifications.

This methodization may include lowering and then raising the input parameters to effectuate objective carving output. This may include lowering and then raising the output conditions, such as controlling the output response to input errors. For instance, if a beginner committed a balance or technical error, the skis natural or real world response of jetting out from under skier would be checked, that is, it would not be physically simulated by the system of the present invention in the initial stages of the instruction. As with tricycles, a grace period is provided for the user to attain a grasp of the skill procedure and not be constantly interrupted with the physical repercussions caused by improper input. Thus, the student would be allowed many uninterrupted repetitions at the positive skill procedure or the working fundamentals.

Once a degree of proficiency has been attained, then the error axes would be triggered to respond. In this fashion, waiting until the objectives are understood and have been physically honed to a sufficient degree, the jetting out of the skis and ensuing loss of balance could be a quick and emphatic reminder of what and what not to do and can become an effective instructional tool. This can be progressed up to and beyond real world specifications. The error axes can be progressed to a state more temperamental then on-slope skiing to demand the utmost skill.

This methodization may include lowering and then raising both the input and output conditions. For example, slow motion lessons can be enacted. Slow motion ski enactment can provide more execution-time between and during skill execution, a more simplified and emulateable sequence and rhythm of skill execution to comprehend and follow. The slow motion lesson would also include an on-screen slow motion instructor to follow. The time scale would then be raised progressively toward real time and real world input and output conditions pulling the student and his motor skill execution up to real world enactment. This methodization may include raising the displayed information beyond real world visuals such as showing the displayed instructor's internal weight/pressure placement throughout the turns for instructional reference.

In combination, these and other forthcoming examples employed by the system of the present invention will pretrain and raise student skiers' parallel carving skills to the point that they would be able to bypass the confusing and time consuming transitional techniques to immediately and safely employ parallel carving technique once they hit the slopes.

SUMMARY OF THE DISCLOSURE

The present invention provides a closed-loop user interactive "carving" ski simulation system which models the skiing event whereby varying quantities of edge and pressure applied by skiers onto modern skis will deform the skis into an arced deflection that has the potential to produce and carve in the snow an unskidded turning arc, based on this edged and bent reverse curvature of the skis. A pair of foot controllers or skis are secured over a variable resistance measuring system, which, in association optimally positioned sensors, will transmit all relevant edge and pressure information by means of an output voltage proportionate in magnitude to applied input. Primarily to sense carving errors or preturn movements, pivotal pressuring can also be sensed and proportionately transmitted. The output voltage of the sensors is converted into a digital format and fed into a computer which runs the force and torque values through modeling equations. The output of the simulation equations corresponds to the users' new turn radius, heading, speed as well as values representing whether the turn is carving, skidding or crashing. Thus, the computer outputs a digital signal representative of the output of the modeled event. Responsive to the computer output signal is a physical movement subsystem and a display system. Included is an instructional subsystem which may further process user input as well as process and control display and physical movement subsystem output to produce the most effective ski simulation lesson and format.

Other features and advantages of the present invention will become apparent and be appreciated by reference to the description of the invention provided below, which should be considered in conjunction with the accompanying drawings.

BRIEF DESCRIPTION OF THE DRAWINGS

FIG. 3 is a top plan view illustrating a sensing module for use with the subject foot-controlled input device.

FIG. 4 is a cross-sectional view illustrating a ski and sensing module for use with the subject foot-controlled input device.

FIG. 5A is a top plan view illustrating a vertical force sensing diagram of sensing modules.

FIG. 8C is a detailed flow chart of the error detection, diagnostics and instructional programs.

DESCRIPTION OF THE INVENTION

Figure 1:
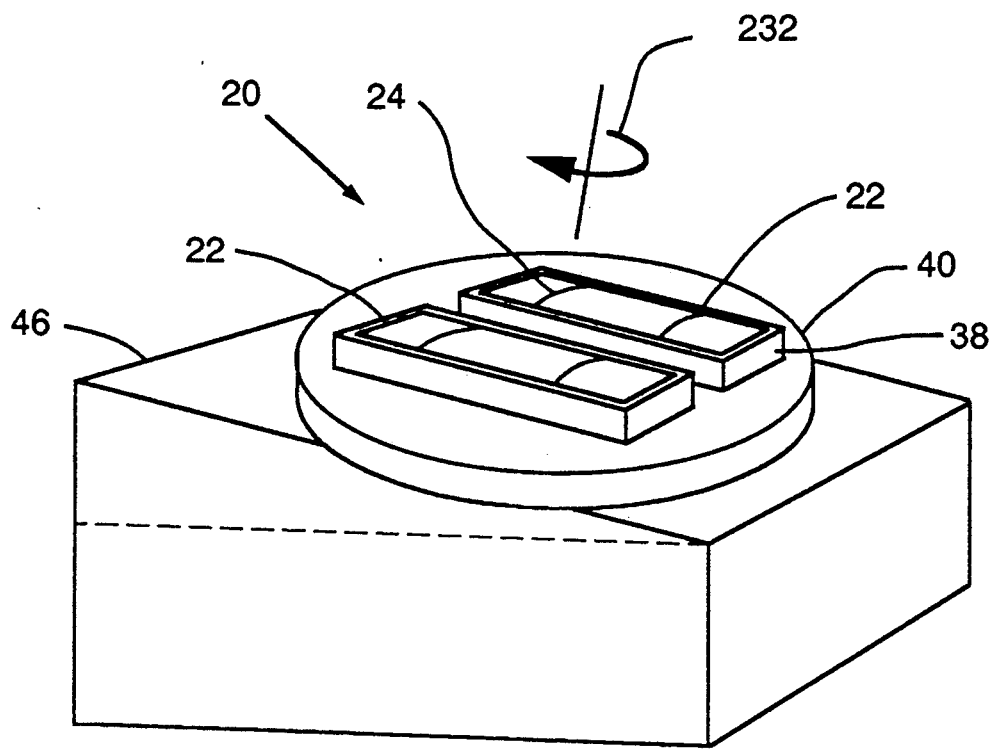
FIG. 1 is a perspective view illustrating a basic foot-controlled input device positioned on a mechanized computer controlled motion system alternative in accordance with present invention.

A ski simulator system 20 in accordance with the present invention is illustrated in FIG. 1. The system 20 includes a pair of ski-shaped foot controllers 22. The foot controllers or skis 22 are made of sufficiently strong material to rigidly support human weight and applied force. Such materials as steel, wood, fiberglass, or of a ski itself can be used. Skis 22 or foot controllers fitted with adjustable bindings 24 to accommodate all street shoe and ski boot sizes. Suitable bindings 24 include a track and slot style with slide-rule type action. These bindings are tightened down on the toe and heel of the user with any type of screw-down locknut or other clamping action, including velcro or cinching straps. Conventional ski bindings can also be used, particularly rental bindings that are adjustable to all ski boot sizes and further adaptable for quick adjustment.

Figure 2:
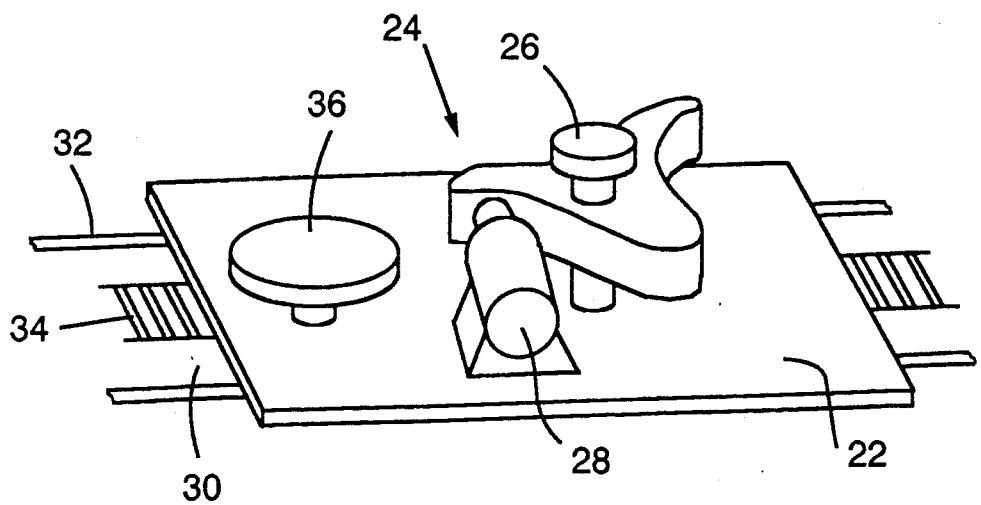
FIG. 2 is a perspective view illustrating bindings for use with the subject foot-controlled input device.

As best illustrated in FIG. 2, bindings 24 are pivot post mounted to skis 22 using either a threaded bolt or a shoulder bolt 26. This enables easy vertical adjustment as well as free lateral mobility. A bidirectional or universal force transducer 28 can be placed adjacent to each binding 24 to sense lateral force, as discussed in greater detail below. The underside of bindings 24 includes a track, rail and center-rib (not shown) to match with opposing track 30, rail 32, and center-rib 34 present on skis 22. A screw down knob 36 is employed for quick adjustment. When knob 36 is loosened, binding 24 will travel forward or backwards on track 30, rail 32 and center-rib 34. In, this way, various foot lengths are accommodated.

Referring to FIGS. 3 and 4, each foot controller 22 is centered and bolted to force transducers 42. The force transducers 42 are in turn centered and bolted to a sensing module 38. On a component level, the force transducers 42 can broadly be described as individual support housings each encapsulating at least one sensing and, preferably, one transductional means. The preferred physical form of the support housing is that of a hollow, low profile, steel, cylindrical column, positioned upright or on end.

Secured within each support housing is one or more elastic "sensing" elements 42 made of a homogeneity-controlled material, preferably a type of steel. The configuration of the sensing elements can be that of a steel tube, solid block, diaphragm, bending beam, flat proving-frame, or a variety of other common configurations applicable for deflection measurement.

Under applied-force, directed preferably through a male or female end-fitting force connection, the sensing elements deform, producing a strain field the magnitude of which is related to the applied force through the elastic constants and geometric shape of the sensing elements. By bonding strain gauges, the generated strain can be accurately sensed and the assembled component system is effectively transformed into a variable resistance force transducer.

Those familiar with the art will readily see that the material, form and assembly of the described force transducers 42 actually describe the most commonly available off-the-shelf force transducers. This is particularly true for those off-the-shelf compression sensing, and bidirectional compression and tension sensing, or what are commonly termed "universal" multi-element force transducers.

Therefore, instead of constructing the force transducers 42 on the component level (i.e. securing individual transduction elements to strainable elements) the above-mentioned, as well as many other, off-the-shelf force transducers, such as force washers of either the strain gauge or piezoelectric type, are applicable for use as sensing modules.

As best illustrated by FIG. 3, a preferred embodiment of the invention includes four force transducers 42 positioned approximately at four corners under each ski 22. A degree of lateral and longitudinal leeway is possible if the four sensors remain centered and in a rectangular configuration under each ski 22.

The two skier inputs which produce the objective, i.e. a carved turn, are applying varying amounts of pressure and varying degrees of edge to modern skis. Naturally, these two inputs are the essential inputs to be sensed and transmitted by the input devices.

Referring to FIG. 5A by combining the described placement of the force transducers 42 with compression sensing capabilities, the precise amount of force/pressure applied to each ski can be measured to determine which ski is weighted, how much each ski is weighted, the amount of force applied, etc. Further, the combination of sensor placement and compression sensing enables the point of concentrated force vertically applied "fore to aft" or along the longitudinal axis of each ski 22 to be calculated to pinpoint the more sophisticated fore-/aft pressure applications which evoke further carving properties from modern skis. This can be accomplished by comparing force readings from the forward force transducers 42 with the force reading from the aft positioned force transducers 42.

Last, the degree each ski 22 is "edged", right or left, into the "snow" can be measured with the described placement and compression sensing capabilities. For more sensitive readings, tension sensing capabilities can be employed along with compression sensing in a bidirectional fashion. The tension values from the unapplied edge lifting can be compared with the compression values of the applied edge compressing down.

Note, the described embodiment measures edging or canting-force over effecting and measuring the actual physical canting motion. From the user's standpoint, the deflection, or right and left tilting-movement, produced as edging input as applied on the above-mentioned force-transduction means is generally quite minimal. This is not only acceptable, but is the objective for this embodiment.

As described above, another important objective is to provide a foot-controlled input device applicable for all footwear. Because all street footwear, unlike ski boots, supply no speakable lateral rigidity, the user's ankle acts as an opposing axis, bending or buckling under force of applied canting input, neutralizing much physical canting output. Further, this neutralization could force the user to overcompensate by applying extreme edging input that, first, would be inappropriate from a ski technique standpoint and, second, would pose the additional possibility of injury, namely to the knee joints' supporting muscles and ligaments. Therefore, sensing force applied on top of one edge, sensing through the ankle joint and degrees of force thereof, in relation to the opposing edge, proves for all footwear both safe and effective.

Figure 7:
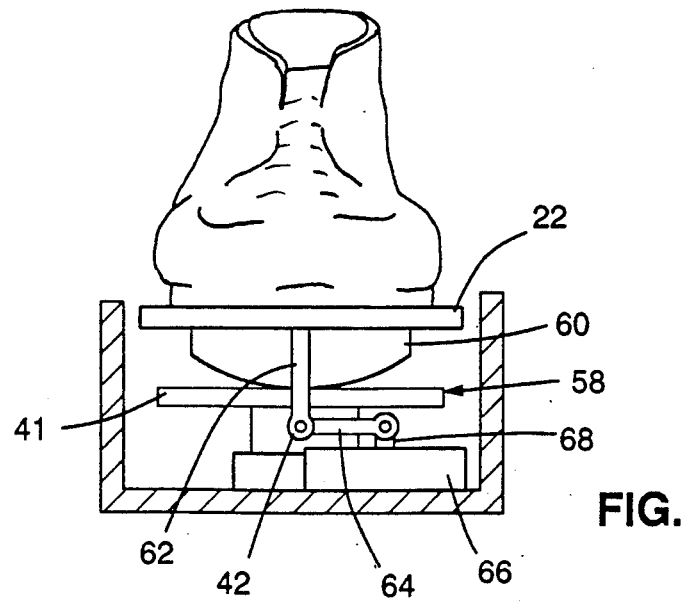
FIG. 7 is a cross-sectional view illustrating a rocker cam mechanism for use with the subject foot-controlled input device.

However, an alternative embodiment used primarily for ski boots will effectuate and sense actual canting motion. As shown in FIG. 7, this embodiment encompasses the simple addition of a rocker mechanism 60 centered under ski 22 and over force transducers 42.

Rocker 60 is a rectangular beam of wood, steel, fiberglass construction, with an arced under-section to facilitate both free rocking motion and incremental positioning with axis travel.

A "fin and groove", or even a more sophisticated "rack and pinion", mounting means assures no cam slippage or transverse travel. Nonetheless, a simple cam and walled perimeter mount, which the boxed platform of the present embodiment all but naturally provides, provides an effective and trouble-free mount for the rocker mechanism 60.

Essentially, the only addition to accommodate this alternative canting sensing means is a "sensing-plate" 41 which secures to the force transducers 42. The rocker-cam 58 is centered on the vertical sensing plate 41 and "box-trapped" in the platform housing.

Exact positioning of the measuring device is not critical, only that the canting-movement is accurately measured. In this alternative canting embodiment, a linear position sensing device, in this case a potentiometer 66, is employed and positioned parallel to axis movement in the extreme fore section of platform. As shown in FIG. 7, a lever 62 is affixed to rocker 60. A linkage 64 from lever 62 to linear potentiometer wiper-terminal 68 is swivel mounted to translate the arcing motion of cam and lever into linear motion. The potentiometer 66 will then convert the translated motion into an electric signal proportionate to movement (i.e. a fractional inch of movement will be represented as a fractional change of voltage). Analog to digital conversion, discussed below, converts the voltage signal into a digital format for the program to read.

It is suggested that the software value for each degree of canting be weighted or scaled down from the actual 1:1 ratio and effectuation of canting, particularly the extreme 40, 50, 60 degrees of applied edging. On the simulator, users would be forced to overcompensate with extreme knee-angulating techniques that first would be technically incorrect, and second, would pose the possibility of knee strain.

This edging input alternative can certainly be the more cost effective. Potentiometers are the much cheaper measuring device. And, because the rocker-cam system is placed over the vertical force transducers 42, eliminating their need to sense pressure applied to either edge of the ski, two of the force transducers can be eliminated. Furthermore, the tension sensing capabilities of the two remaining force transducers 42 can be eliminated. Note that the rectangular sensor configuration or two parallel rows of force transducers would give way to one row of two force transducers centered longitudinally under each foot controller to sense vertical pressure along this longitudinal axis.

Torsional-based shear skier input or pivoting the skis, though not essential as carving input, could be considered essential to diagnosing carving errors. Swiveling the skis automatically throws the skis into a skid proportionate to the pivot-action. Because this error is one of the most prevalent in the ski world, simulating the adverse result of pivoting input can prove quite effective for instructional purposes. Of course, there are many positive or effective torsional, as well as predominantly straight, lateral-based shear skier inputs, such as slow speed steering, preturn and end-of-turn lateral movements, etc. Torsional/lateral shear inputs plainly are a common ski-input phenomenon. Sensing shear inputs is warranted at least for the more sophisticated input devices and simulation systems.

Figure 5B:
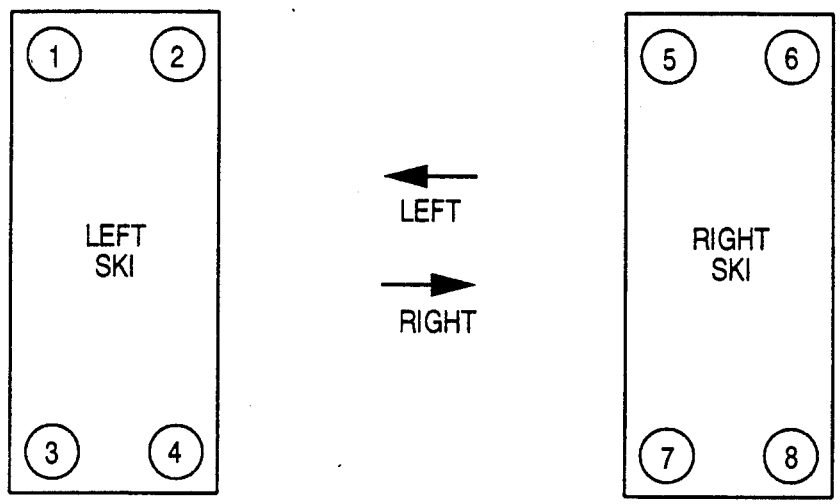
FIG. 5B is a top plan view illustrating a lateral force sensor diagram of sensing modules.

A lateral force foot sensor diagram is shown in FIG. 5B. Shear force can be sensed by bonding to the sensing elements within the force transducers such strain gauges as 90 degrees rosettes, which can simultaneously measure transverse as well as axial strain. In this multi-element configuration, both vertical and shear forces can be monitored. Though less prevalent, off-the-shelf multiple-axis force transducers possessing this multi-element configuration are also available. Also, strain gauges or piezoelectric washers with a washer configured to detect shear force can also be mountable to the sensing modules. Combined with a vertical sensing washer, this would form a multicomponent washer system.

The preferred method employs a pair of off-the-shelf compression and tension, or "universal", sensing force transducers positioned on top of the simulated ski, adjacent and at right angles to each pivot-post mounted binding 28. Secured to the bindings at right angles to pivot axis, all lateral and pivotal force applied in either direction can be accurately monitored.

Equipped with this lateral sensing capability, the skis can be centered upon and secured to the rocker sensing alternative. Note that for the rocker-cam alternative, this lateral sensing embodiment is the only effective lateral sensing means. Alternately, the lateral-sensing skis can be secured directly to the sensing modules, which, of course, would only possess vertical sensing capabilities.

According to recent world class race technique, during the end of a turn, instead of pulling their upper body weight slightly back over the heels to weight the heel or aft section of the skis, racers might push the skis slightly forward. Technically, this is not an input applied to the skis, but a biomechanical input applied to feet and legs. Nonetheless, securing another strain gauge transductional element to an appropriately positioned sensing element within the force transducers can take this optional biomechanical technique into account.

However, it was found that a fixed mounting, bolted to the base element as described below, works on the same biomechanical principle employing the same muscle action. Instead of a skier's upper body acting as the fulcrum upon which the leg muscles lever the feet forward, it is the feet, or actually the longitudinally fixed mounting, that acts as the fulcrum upon which the same muscle action levers the upper body weight back the few intended centimeters over the heel or aft section of the skis. Therefore, the need for an expensive addition of fore/aft shear sensing capabilities, processing of information and/or axis motion all in a simulation mode is eliminated by the combined mounting means and natural biomechanics.

Nonetheless, employing this sensing capability so as to detect longitudinal shear force, but on a threshold basis, almost in the fashion of an on/off switch, is considered a cost effective instructional/diagnostic option for the serious instructional systems. The execution and proper timing of the skill can be detected while the weight that is leveraged back will vertically pressure the aft section of the ski and evoke from the simulation colourations the proper simulated results.

If another mounting means were employed, full simulation software and procedure could be initiated off of the above variable resistance longitudinally shear sensing capability.

Hence, all relevant inputs a skier applies on and to a ski are sensed.

Referring back to FIG. 1, the subject invention also includes a base element 46. Base element 46 can be rectangular or circular in shape and must be sufficiently strong to hold a user's full weight and force. Suitable materials from which base element 46 can be fabricated include metal, wood and fiberglass. Base element 46 can be level as used in a non-motion embodiment, and/or declined when used for motion simulation, as described in greater detail below.

Figure 6:
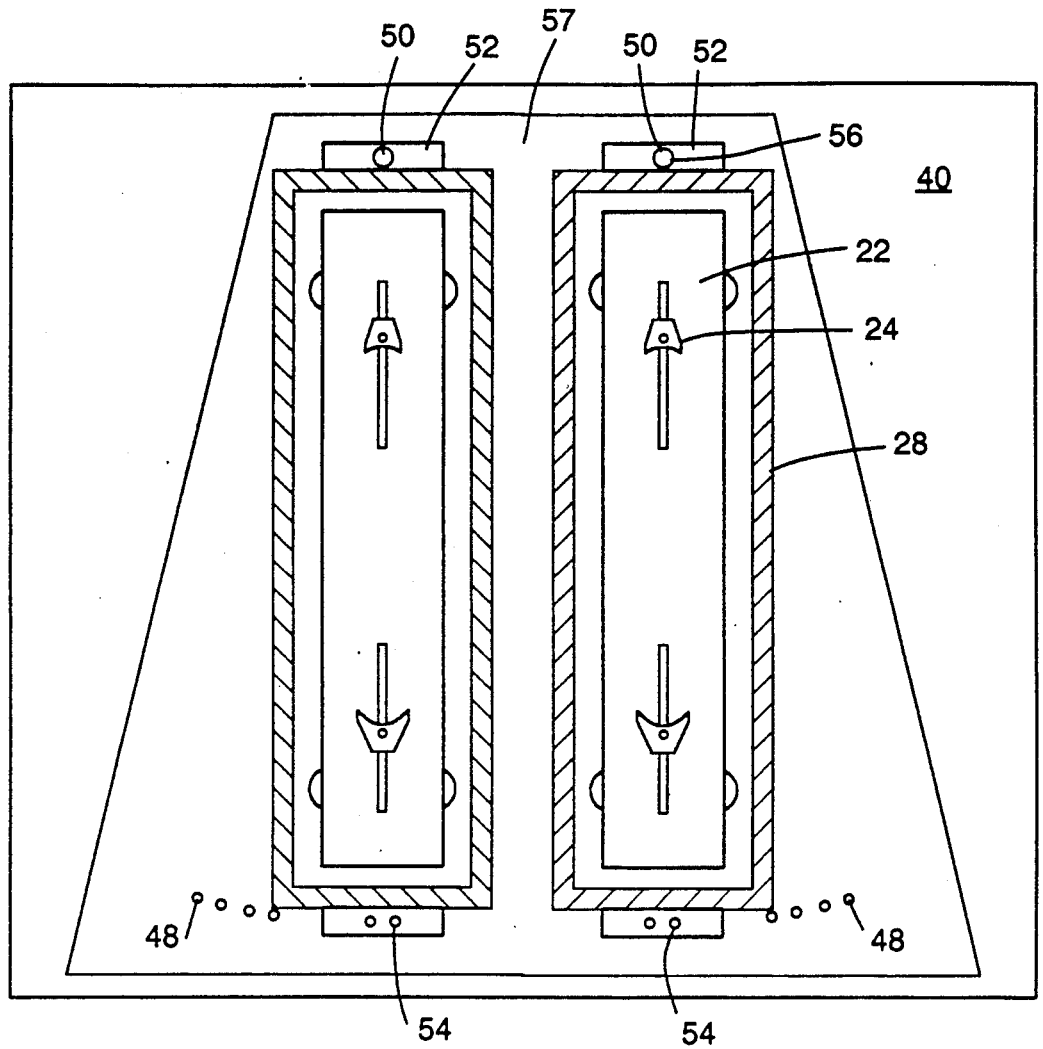
FIG. 6 is a top plan view of a platform and skis for use with the subject foot-controlled input device.

Referring now to FIG. 6, skis 22 or other suitable input devices, are secured to platform 40 via securing plate 52. On either end of platform 40 are apertures 48 which match with opposing apertures 54 on securing plate 52 and support bolt type securing means. Bolts 50 that enable free arcing rotation, such as shoulder bolts, can be used to secure the front of securing plate 52 to platform 40. In this way, skis 22 are rotatable about a forward pivot axis. An angular sensing potentiometer 56 can be fastened to the forward pivot axis.

The tail of securing plate 52 is secured to platform 40 via rear bolts (not shown), preferably a dual bolt assembly, that fits into one of the several opposing apertures 54. In this way, skis 22 can be solidly secured into various positions from snow plow to parallel by dropping the dual bolt assembly in the appropriate apertures 48.

To provide for free movement or positioning, e.g. for conventional transitional ski techniques, the dual bolt assembly can be left out of the rear apertures 48. A skid plate 57 can be affixed to platform 40, beneath skis and force transducers' securing plate 52, to provide unhindered mobility.

CONVERSION OF SENSOR TO INPUT DATA

Force is converted directly into a proportional electrical output signal via the following method. The transductional element 42, preferably a strain gage mounted to a measurable surface or sensing elements, deforms to varying degrees under compression or tension applied to the sensing element 42. Each variation or deformation produces a corresponding change in resistance, which in turn produces a corresponding change in the output signal voltage. This output voltage is the resulting measurement of force in terms of strain.

The sensitivity of a strain gage is the gage factor, i.e., the ratio of the unit change in resistance to the unit change in length, or $$GF = \frac{\Delta R/R}{\Delta L/L} = \frac{\Delta R/R}{\epsilon}$$

where:
$GF$ = gage factor
$\Delta R/R$ = unit change of resistance
$\Delta L/L$ = change in length
$\epsilon$ = strain.

Next, by means of an electrical circuit, the input resistance is converted to output voltage. This analog output voltage must be rapidly converted from analog voltage to a digital format capable of being read by a computer. To assure that the speed of accusion, conversion and transmission of an accurate and rapid flow of information meets the task for continuous simulation purposes, the present embodiment uses a single high speed mutiply analog to digital converter or single converters for each sensor that can be accessed continuously by computer.

CONVERSIONS FROM INPUT DATA TO READINGS OF FORCE FOR EACH SENSOR

Using as inputs the converted resistance voltage, the digital reading can be converted into strain by the following equation:

$$\epsilon = \frac{-4V_R}{GF(1 + 2V_R)}$$

where:

$$V_R = \left[\left(\frac{V_{OUT}}{V_{IN}}\right)_{STRAINED} - \left(\frac{V_{OUT}}{V_{IN}}\right)_{UNSTRAINED}\right]$$

and:
$V_{OUT}$ = output of wheatston bridge
$V_{IN}$ = input to bridge this should be static as controlled by a precise voltage regulator.

COMPUTER PROGRAMS

A. Determining A Turning Radius

As stated above, an analog to digital convertor continuously samples, converts, and transits digital force values to the computer to coincide with the modeling process. (it should be noted that digital sensing techniques are also encompassed by the concepts of the present invention.)

To best understand the simulation calculations, as well as the entire control loop sequence, an understanding of the basic input steps that a skier executes to produce a carved turn is helpful. Depending upon the circumstances, the first step to initiate a carved turn involves either first applying a edging, applying pressure, or executing both skills simultaneously.

Because an edged ski has no input unless weight is applied to it (i.e., it is pressed into the snow), the present program chooses applied pressure as its first calculation.

More importantly, by finding the pressure and the ski that is pressured the most, thus finding the control ski first, only one ski's inputs, not both skis', must continuously be sampled for the carving calculations throughout each control loop.

That is, because of weight/force's commanding superiority as an input, running to entirety both skis' inputs through each control loop would be redundant. This is particularly true in the context that this instruction program is presented. Much emphasis is placed on the need to weight one ski, the outside ski, as the control ski and to use the inside ski to alleviate degrees of deflecting pressure on the weighted ski. Nonetheless, if the control ski's weight is found not to be substantially greater, the routine during error detection can also sample and compare the other ski's edging and pressure-leveraging inputs with those of the weighted ski's to assure they do not conflict.

To find the weighted ski, the sampling sequence is as follows. The first step is to find the vertical force applied to both skis. The total force applied to the skis is the sum of the forces read from all vertical sensors. Next, the total force of the left ski must simply be compared with those of the right ski. If applied force to the right ski is greater than applied force to the left, the right ski is the "weighted ski". Conversely, if applied force to the left ski is greater than applied force to the right, the left ski is the weighted ski or controlling ski.

The next step is to run the basic radius calculations for the weighted ski. Refer to drawing FIG. 10, the first step in this calculation is to find deflection due to loading using the following equation:

$$d_{max} = d\left(\frac{L}{2}\right) = \frac{FL^3}{48(EI)}$$

where:
$d_{max}$ = deflection of ski at midpoint
$F$ = applied force
$L$ = length of ski $E$ = modulus of elasticity of ski (this must be calculated for each ski type)

$I$ = cross-sectional moment of inertia
= $\frac{bh^3}{12}$ (for a rectangular cross-section)

where:
$b$ = base width of the ski
$h$ = ski thickness

Deflection has been assumed to be constant along the length of ski.

Deflection (d) is now represented in terms of the applied force and a ski's length, width, height and elastic modulus. A ski, however, has a certain amount of induced camber. Therefore, it takes a certain amount of force to actually make a ski straight before any deflection occurs. This force will be called the flattening force, $F_0$, and is a ski characteristic.

Therefore:

$$d = \frac{(F - F_0)L^3}{48(EI)} \text{ for all } F > F_0$$

We will assume the ski maintains a straight line for all $F < F_0$.

Figure 10:
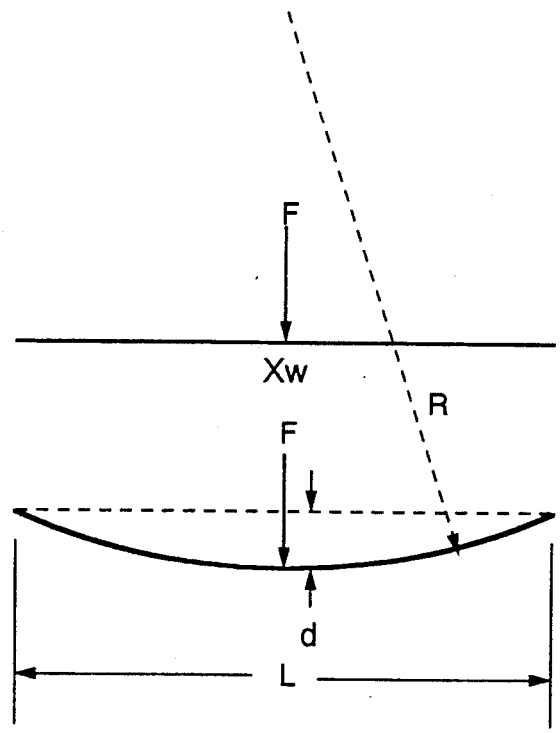
FIG. 10 is a diagrammatic representation illustrating a deflected ski used to determine the basic turn radius, $R_B$, used in the carving calculations.

To find $R_B$ the basic turn radius as a function of the deflection, d, some simple geometry based on the assumption that a bent beam takes an arc of constant radius provides the following equation. FIG. 10 illustrates this concept diagrammatically where:

$R = h + d$
and
$R^2 = h^2 + (L/2)^2$
where:
$L$ = length of ski
$E$ = basic radius of turn
$d$ = deflection of ski due to weighing
$h$ = see drawing
$R^2 = (R - d)^2 + (L/2)^2$
$R^2 = R^2 - 2Rd + D^2 + (L/2)^2$
$2Rd = D^2 + (L/2)^2$ $$R_B = \frac{V^2 + (L/2)^2}{2V}$$

where:

$$d = \frac{(F - F_0)L^3}{48EI}$$

$l$ = ski length
Therefore:

$$R = \frac{\left[\frac{(F - F_0)L^3}{48EI}\right]^2 + \frac{L^2}{2}}{\left[\frac{2(F - F_0)L}{48EI}\right]}$$

where:
$F$ = applied force
$F_0$ = force needed to flatten ski (given)
$L$ = ski length
$E$ = ski elastic modulus $$I = \frac{bh^3}{12}$$

where:
$b$ = base width of the ski
$h$ = ski thickness

The Rb-calculations assume that the point force is applied midpoint to the ski. This assumption is likely valid. The bindings of all skis, including both recreational and racing skis, are mounted so as to place the ball of a skier's foot dead center to the ski's running surface. However, it is unlikely and technically incorrect for the skier's weight to stay centered on the ball of the foot throughout a turn. Thus, to account for input modifications, a correcting calculation "Rc" immediately follows Rb to determine the true point of concentrated force applied by a user, covering the full range of fore to aft (toe to heel) pressure applications, and nullifying any calculation errors previously made by the initial Rb assumption.

As previously stated, the first step in initiating a carved turn may also involve applying edge to the turning ski. Applying a sufficient degree of edge is the objective not only in holding the ski from sideslip, but in ensuring that the desired deflection or reverse camber is possible.

Primarily, the ski characteristic responsible for this is the sidecut and sidecuts can vary infinitely from model to model. Therefore, the sufficient degree of edge, in the calculations termed K edge, will vary from ski to ski and condition to condition. This is, therefore, a weighted factor, and is calculated by omission, as a constant input factor during the Rb calculations. As with fore to aft pressure, it is both invalid and inappropriate to assume that any one edge position would be held constant. Therefore, during edge correction calculations, the true edge value is ascertained and incorporated to appropriately modify Rb radius.

The last initial carving step which may also be simultaneous to the prior two, is applying the degree of leverage best for the desired radius and circumstances. As a rule, the steeper the slope, or the sharper the intended turn, the more forward from center the pressure is applied. Conversely, the flatter the slope and the wider the intended turn, the farther back the initial pressure is applied, relative to the specific ski model and conditions.

If the skier feels the turn is producing the desired arc, the next step is usually to reposition the leverage to a centered or balanced position over the ski to sustain the arc.

If readjustment is necessary, more applied pressure, more forward pressure, and more edge angle are the inputs required to tighten a turn radius. To widen a turn radius, pressure is released and pulled back and the degree of edge angle is lessened (all factors dependent on individual skis and conditions).

Once the turn is completed to the desired degree, the final step is either to neutralize the turn (i.e. straighten the line) or to traverse or neutralize the turn to begin the next turn and then repeat the process. The same pressure and edging adjustment skills are used to neutralize turns.

The adjusting or corrected radius calculations are as follows. Edging effect on the basic turn radius must first be determined. To do so, it has been assumed that the more edge, the sharper the turn. Therefore:

$$R(\text{After Edge Calc.}) = R_B(Z_{edge})$$

where:
$R_B$ = basic turn radius
$Z_{edge}$ = edge factor
and:

$$Z_{edge} = 1 + K_{edge}\left[\frac{F_{edge} - F_{no\ edging}}{F_{no\ edging}}\right]$$

where:

$K_{edge}$ = Edge constant; this can be varied depending on empirical results to give the proper weight to the edge factor.

$F_{edge}$ = The actual applied force to the edge of the weighted ski (not the total force).

$F_{no\ edging}$ = Force as if there were no edging:
$$= \frac{F(\text{total for weighted ski})}{2}$$
as if each edge received the same amount of the total ski weight.

$F_{edge}$ is the sum of the two forces (fore and aft) for a given side of the ski.

Note that if the right ski is weighted, it is the left (inner) edge that is important. Extra weighing on the right edge will cause a negative value inside the edge factor calculation making the turn radius larger (rather that smaller).

Conversely, the important edge of the left ski is the right (inner) edge. Therefore:
For weight right ski: $F_{edge} = F_{RL}$
For weight left ski: $F_{edge} = F_{LR}$. and:

For weighted right ski:

$$Z_{edge} = 1 + K_{edge}\left[\frac{F_{RL} - \left(\frac{F_{RT}}{2}\right)}{\left(\frac{F_{RT}}{2}\right)}\right]$$

For weighted left ski:

$$Z_{edge} = 1 + K_{edge}\left[\frac{F_{LR} - \left(\frac{F_{LT}}{2}\right)}{\left(\frac{F_{LT}}{2}\right)}\right]$$

where:

$K_{edge}$ = Empirically derived edge constant.

(See Force Name Conventions in Table 1.)

TABLE 1

| FORCE NAME CONVENTIONS | |
|---|---|
| $F_{TOTAL} =$ | Total force on both skis |
| $F_{LT} =$ | Total force on left ski |
| $F_{RT} =$ | Total force on right ski |
| $F_{LF} =$ | Force on forward part of left ski |
| $F_{LA} =$ | Force on aft part of left ski |
| $F_{RF} =$ | Force on forward part of right ski |
| $F_{RA} =$ | Force on aft part of right ski |
| $F_{LL} =$ | Force on left edge of left ski |
| $F_{LR} =$ | Force on right edge of left ski |
| $F_{RL} =$ | Force on left edge of right ski |
| $F_{RR} =$ | Force on right edge of right ski |

Next, the fore-aft weight distribution effect on turn radius is determined. Again, it has been assumed that the more forward the force application, the sharper the turn. Therefore:

$$R_C = R_B(Z_{edge})(Z_{fore-aft})$$

where:
$R_C$ = corrected radius
$R_B$ = basic-turn radius
$Z_{edge}$ = edge factor
$Z_{fore-aft}$ = fore-aft factor.
As in edging, the following equation applies.

-continued $$Z_{fore\text{-}aft} = 1 + K_{fore\text{-}aft} \left[ \frac{(F_{fore}) - \left(\frac{F_{total}}{2}\right)}{\left(\frac{F_{total\,for\,ski}}{2}\right)} \right]$$

For Weighted Right Ski:

$$R_C = \left| \underbrace{\frac{\left[\frac{(F_{RT} - F_0)L^3}{48EI}\right]^2 + \left(\frac{L}{2}\right)^2}{\left[\frac{2(F_{RT} - F_0)L^3}{48EI}\right]}}_{R_B} \right| \underbrace{\left[1 + K_{EDGE}\left[\frac{F - \left(\frac{F_{RT}}{2}\right)}{\left(\frac{F_{RT}}{2}\right)}\right]\right]}_{Z_{EDGE}} \underbrace{\left[1 + K_{FORE\,AFT}\left[\frac{F - \left(\frac{F_{RT}}{2}\right)}{\left(\frac{F_{RT}}{2}\right)}\right]\right]}_{Z_{FORE\,AFT}}$$

For Weighted Left Ski:

$$R_C = \left| \frac{\left[\frac{(F_{LT} - F_0)L^3}{48EI}\right]^2 + \left(\frac{L}{2}\right)^2}{\left[\frac{2(F_{LT} - F_0)L^3}{48EI}\right]} \right| \left[1 + K_{EDGE}\left[\frac{F - \left(\frac{F_{LT}}{2}\right)}{\left(\frac{F_{LT}}{2}\right)}\right]\right] \left[1 + K_{FORE\,AFT}\left[\frac{F - \left(\frac{F_{LT}}{2}\right)}{\left(\frac{F_{LT}}{2}\right)}\right]\right]$$

Where:
$L$ = ski length
$F_0$ = ski flattening force
$E$ = ski elastic modulus $$I = \frac{bh^3}{12}$$

where
$b$ = base width of the ski
$h$ = ski thickness
$K_{EDGE}$ = edge constant
$K_{FOR\,AFT}$ = fore-aft constant where:

$K_{fore\text{-}aft}$ = fore-aft constant; this we will vary for a given ski depending on empirical data. This sets the importance of the fore-aft factor.

$F_{fore}$ = actual force on forward part of weighted ski.

$F_{total\,for\,ski}$ = total force on the weighted ski.

Therefore:
For weighted right ski:

$$Z_{fore\text{-}aft} = 1 + K_{fore\text{-}aft}\left[\frac{F_{RF} - \left(\frac{F_{RT}}{2}\right)}{\left(\frac{F_{LT}}{2}\right)}\right]$$

where:

-continued $K_{fore\text{-}aft}$ = empirically derived fore-aft constant.

(See Force Name Conventions in Table 1.)
Therefore:

Referring to FIGS. 8, 8a, 8b and 8c, throughout the simulation process, a computer program can be used to continuously check for active swiveling of the feet, indicated by lateral force gages as pivoting input 98. If carving can be defined from edging and pressuring input as the action where the edge of the entire length of the bent ski passes through the same groove, then pivoting input 98 can be defined as a rotation action generated from midpoint above the ski that would swivel the ski out of any possible groove and into a skid. The extent or force of the pivot action will determine the extent of pivoted skidding.

Sometimes subtle pivoting for steering purposes is technically correct. For instance, when the turn is initiated at speeds too slow for carving input/output or when the turn is sharper than reverse camber can manage, e.g., very short swing turns, pivoting can be used. Generally, however, pivoting is a technical error—physically throwing the skis sideways or around to change the turning direction. This is what the lateral transducers 28 and the ensuing calculations detect and model—any lateral based biomechanical movements. Thus, beyond on-snow pivoted movements, which always deliver some degree of skidding, the lateral gages 28 also detect the unweighted ski-positioning and placement movements that may not be skidding, as well as all other lateral movements, particularly those of instructional transitions. These may be race caliber lateral projection techniques or snow plow ski-positioning of a novice. Note that sensing both skis is important to ascertain the direction heading of the "new" turning ski, specifically when it is applied as a preturn, or between turn, lateral based movement.

DETERMINE NEW HEADING, SPEED AND POSITION

The turn radius can be used a new heading, speed and position in the following manner. First, the current position and linear velocity, which contains both speed and heading must be determined. These are outputs of the previous round of simulation calculations, or at initialization are simply given. Next, the turn radius from the force calculations explained above is derived. Third, using velocity and radius, the center point of turn is determined. Fourth, using current linear velocity, angular velocity is found. Fifth, using a current position, angular velocity, center point and simulation clock unit, a new position is determined. Sixth, using the new position center point and angular velocity, a new linear velocity is found. Seventh, using an updated position and velocity, a new turn radius is sampled and steps one through seven are repeated.

Figure 11:
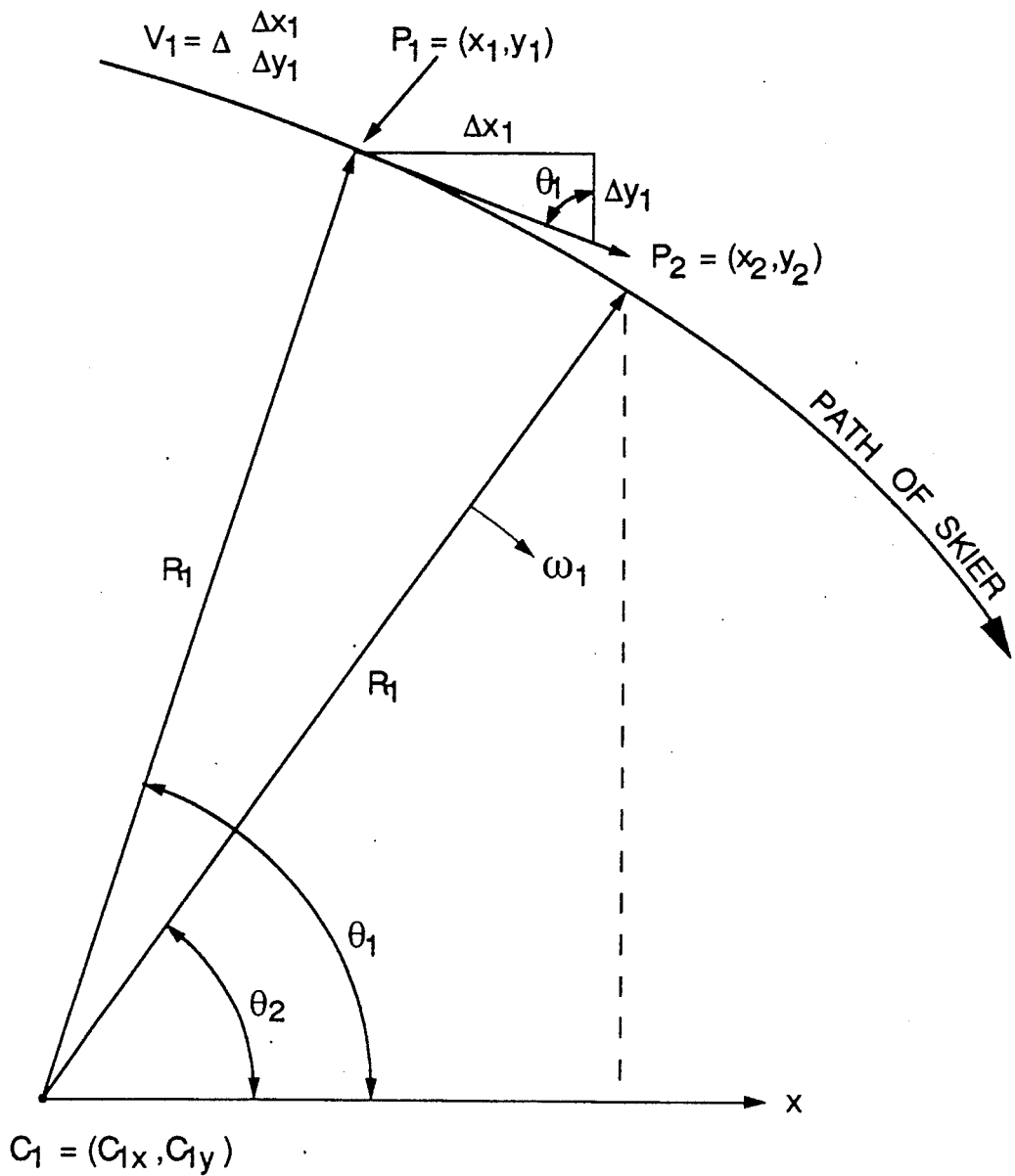
FIG. 11 is a diagrammatic representation illustrating the determination of a skier's new position and velocity.

Referring to FIG. 11, the following calculations are used to determine the new heading, speed and position described above.

Inputs:
$R_1 = R_B$ = turn radius
$V_1$ = current linear velocity $\frac{\Delta X_1}{\Delta Y_1}$ = curent heading $P_1 = (X_1, Y_1)$ = current position
$\Delta t$ = simulation clock unit.

1. Find current heading in angle form $$\theta_1 = \tan^{-1}\left(\frac{\Delta X_1}{\Delta Y_1}\right)$$

2. Find center of turn
$C_{1X} = X_1 - R_1 \cos\theta_1$
$C_{1Y} = Y_1 - R_1 \sin\theta_1$ 3. Find angular velocity $$W_1 = \frac{V_1}{R_1}$$

4. Find new angular heading
$\theta_2 = \theta_1 - W_1(\Delta t)$ $$\theta_2 = \theta_1 - \frac{V_1}{R_1}(\Delta t)$$

5. Find new position
$X_2 = C_{1X} + R_1 \cos\theta_2$
$Y_2 = C_{1Y} + R_1 \sin\theta_2$ 6. Find new linear velocity
$V_2 = V_1$ speed assumed constant (to change)

$\frac{\Delta X_2}{\Delta Y_2} = \tan\theta_2$ new heading

7. Repeat this process with new position, velocity and sensed radius.

SKIDDING

Skidding occurs when the force outward that a skier develops through speed, sharpness of turn and weighing exceeds the force acting inward based on friction. The inward force is, therefore, dependant upon edging, position on slope, snow conditions, ski type and applied weight. Note in this context that pivoting is essentially an oversteer action, an outward or lateral force that by its very execution severly limits the implementation of edging and inward force. Also, it should be noted that when a skier weights both skis, he not only is cutting his decambering force in half (with equally applied weight), but is cutting his inward force in half.

Figure 12:
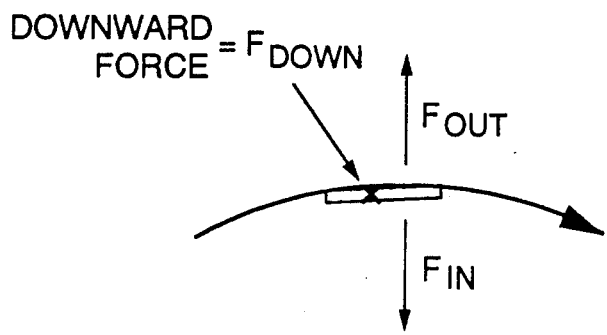
FIG. 12 is a diagram illustrates the determination of skidding calculations.

Referring to the skidding diagram shown in FIG. 12, the calculations for determining skidding are as follows.

$F_{IN} \gtreqqless F_{OUT}$ for the unskidded turn
where:

$F_{OUT}$ = apparent force outward created by skier $$= M\left(\frac{V^2}{r}\right)$$

where:

$M$ = skier mass $= \frac{F_{total}}{g}$ $V$ = speed
$r$ = turn radius
$g$ = acceleration of gravity $F_{IN}$ = resistant force of edged ski $= (F_{down})(\mu_S)$ where:

$\mu_S$ = coefficient of friction

= $f$(snow condition, edging, ski type)

$F_{down}$ = downward force (normal to turning surface)

= $f$(weight, added down thrust, angle of down thrust)

DIAGNOSTICS

Figure 8:
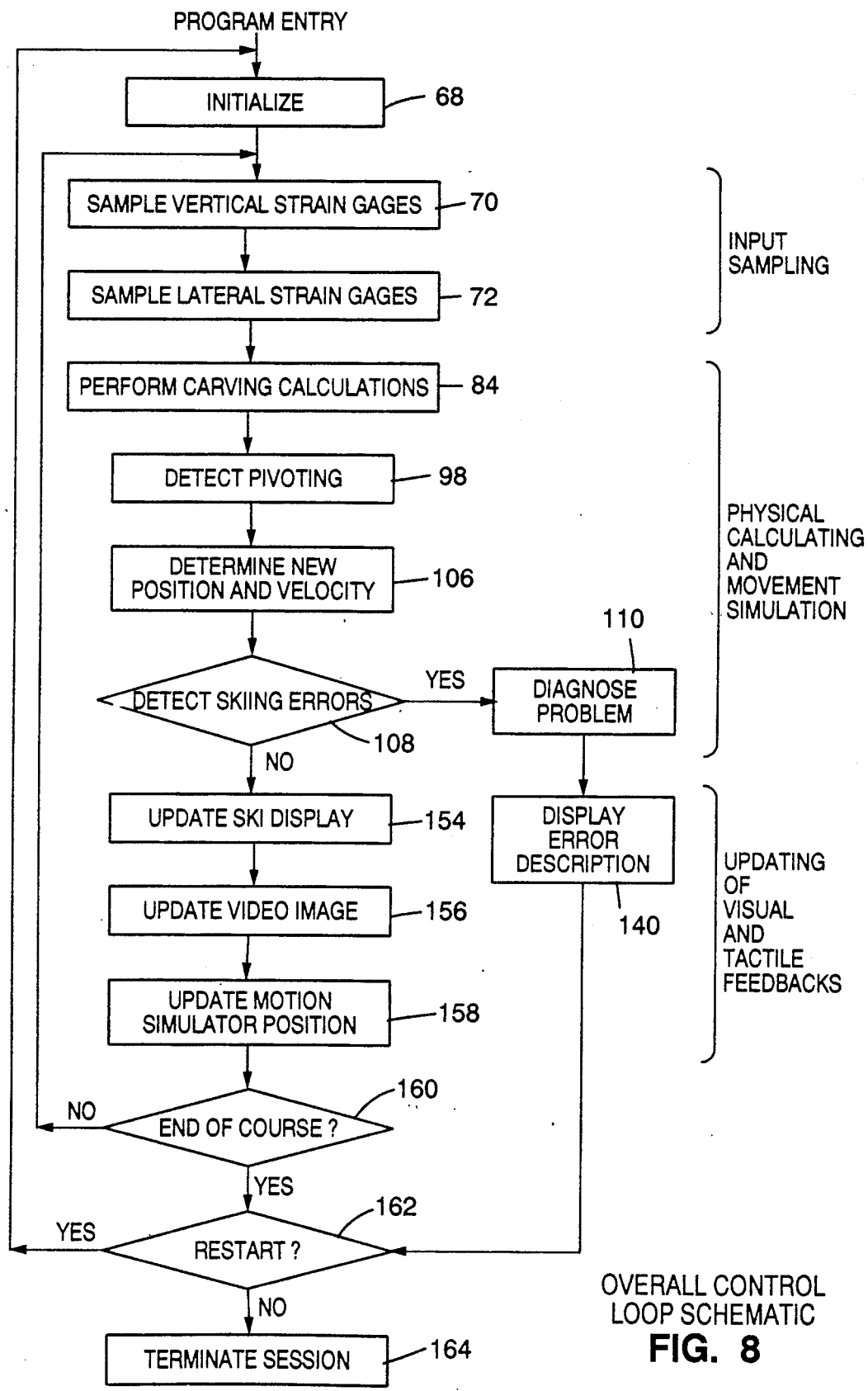
FIG. 8 is a flow chart of the overall control loop of the software used with a ski simulation device in accordance with the present invention.
Figure 8A:
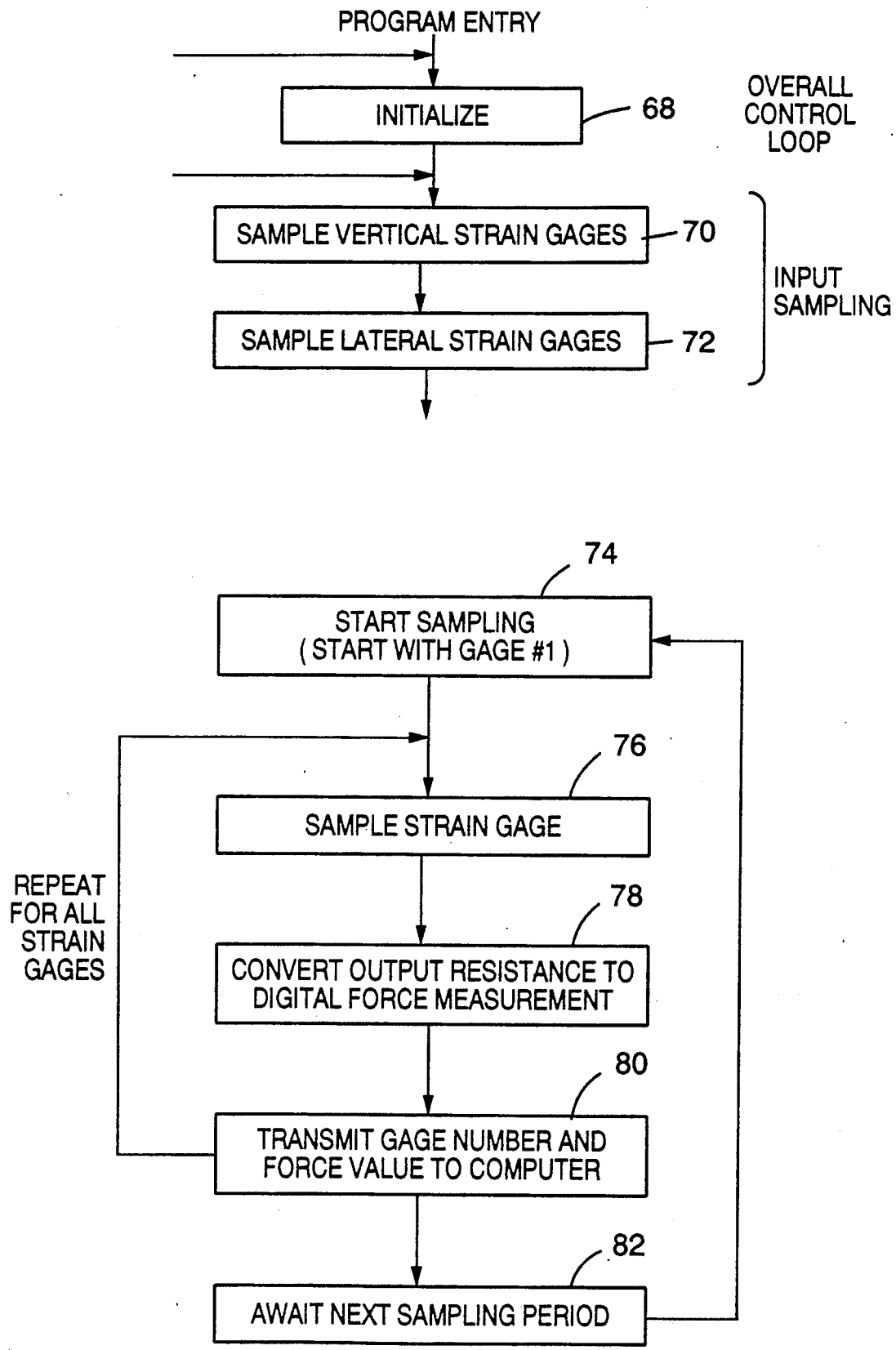
FIG. 8A is a detailed flow chart of the input sampling program.
Figure 8B:
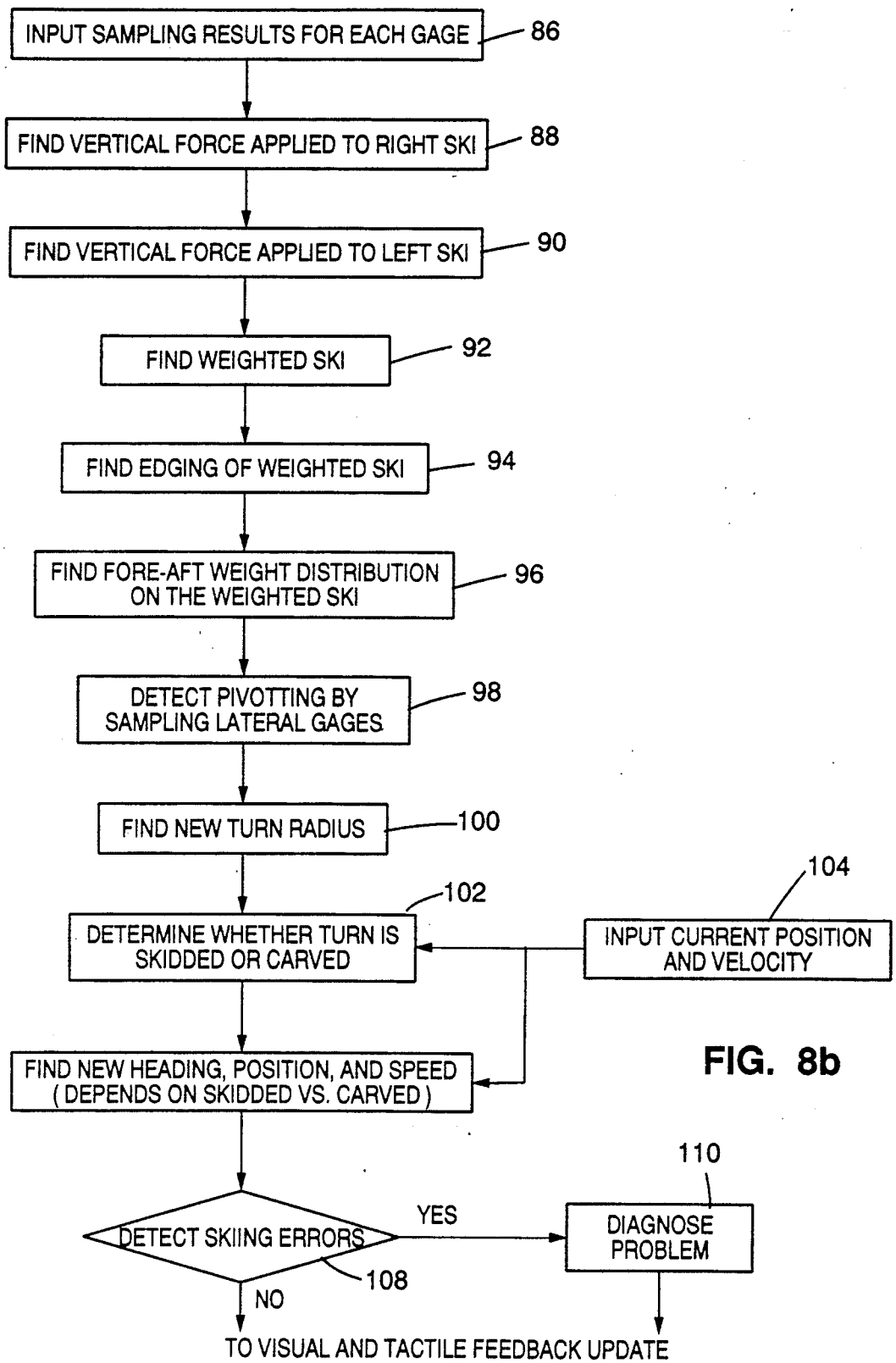
FIG. 8B is a detailed flow chart of the physical calculations and movement simulation program.

Once the updated parameters have been determined such as the velocity, position, heading, turn radius, whether the turn is carved or skidded etc., values can be tested to see if they fall within allowable ranges. If the values do not fall within the allowable ranges, errors have occurred 108 (FIG. 8b). This evaluation process is best accomplished with the use of table look-ups. Error detection is further broken down into two categories, absolute errors and relative errors, both to be processed through their respective tables.

Note, that determining whether a turn is skidded or carved 102 (FIG. 8b) is a form of error detection. However, beyond the few noted occasions where skidding a turn is acceptable, skidding even during a carving breakdown has a heading and velocity and must be computed as such—as a turn in progress. Additionally, skid determination can be used to sound the alarm on skidding output. Further error detection might decipher whether a breakdown not only exceeds the limits of carving but exceeds the limits of skidding as well, thus falling into a crash category. During instruction, further detection could be used to determine how and why the user skidded or crashed.

As opposed to errors that are relative to the skier's position and circumstance, absolute errors are unacceptable inputs and outputs programmed as errors for all circumstances. For example, there will be a maximum speed that if exceeded at anytime will trigger the skier to crash. In reality, what usually brings down a skier is not the rising rate of speed during straight running. A fall is usually precipitated by an attempted direction change and more precisely the severity of the direction change at such excessive speeds. Therefore, a maximum sharpness or minimum turn radius for a given rate of speed can be tabulated to enforce and model this "catch-22" of skiing.

Examples of other absolutes include extreme fore or aft pressure, extreme weighing of the inside ski, as well as incorrect and extreme combinations thereof. The user's variables 112 (FIG. 8c) to predetermined constants. Using speed as the example, if the speed constant is 35 m.p.h., and the skier exceeds this speed, a crash ensues. The predetermined constants can be subdivided, taking into account such things as skill levels, snow conditions, ski types, radii, etc.

Constructing a look-up table is achieved by first outlining the variables that are to be checked and next, deriving the maximum and/or minimum values for the variables. Third, the values can be tabulated in a format that would allow for the most efficient computation.

Relative errors are errors relative to moment and position. During the instructional routine, for instance, the maximum/minimum values of the user's turning variables can be matched with a simulated instructor's corresponding turning variables as the user attempts to follow the instructor. If the user's moment and position are not within the programmed tolerance level at any given point, relative errors have occurred. More importantly, the cause of the error will also be detected. This is the critical addition to the reference error table look up during an instructional session. Not only are the output variables tabulated, position coordinates x, y, (and z, the angle of the slope, if necessary), time, speed, turn radius, etc., but for diagnostic purposes, the correlating input variables, the weight, edging, fore/aft leveraging, etc., the inputs that brought the instructor to the given position and time frame, are also tabulated reference values to find the cause of the user's error 128 (FIG. 8c).

During racing or free skiing sessions, relative error detection would generally be used to detect if the user misses or runs into race gates, or runs into any obstacle present on the simulated ski slopes (e.g., trees, skiers).

Once the error has occurred and an appropriate result of the error is simulated 126, 134 (FIG. 8c), then an appropriate message will be displayed. For instruction, if the user does not match the instructor's output within the consigned bounds, the user will be notified of his output error. For racing, a user might be notified that he missed a race gate and is disqualified. This notification would be less significant for free skiing since a crash is generally self-explanatory.

Recommendations for corrective action 144 (FIG. 8c) can also be given and are solely an instructional duty, formulated from the feedback of those variables which are found out of bounds. Some diagnostic routines will be more complex than others dependant upon both the error that the user has made and the sophistication or expertise programmed into the system.

The preferred diagnostic system keeps track of the errors 128 (FIG. 8c) to determine both the error performance 130 and the repetition of committed error 142. The latter may also be determined by tallying repetition of the same display messages.

Keeping score of errors, or determining the error performance 130 can be used to update the instructional progression. For instance, if the skier has been errorless for a specified time or distance skied, speeding up the instructional progression would be in order. Additionally, the simulated skiing lesson can begin in slow motion, including a slow motion instructor to follow, providing a more emulateable sequence and rhythm of interrelated skills to comprehend and follow. The slow motion session would progressively speed up to a real time display. The error performance could be checked to determine if the progression rate should be accelerated or slowed. This process can be accomplished by speeding, or slowing, the real time clock, the time-scale calibration of the simulation process, and supplying the appropriate table look-up value.

The determination of error performance 130 may effect not only this particular progressional routine, but also the progression to the next full level of instruction, or possibly the actuation of more severe movement simulation (e.g., actuating error axis or accessing a steeper simulated slope angle).

This, combined with the diagnostics, provides the user with a private lesson. The system adjusts to the user's mistakes and performance to provide a corresponding individualized lesson, progressing at a rate unique to each student. If errors and causes of error are repeated, suggesting that the prior recommended corrective action had not been sufficient, the user can be offered more in depth help, in the form of options 144. One such option might be to isolate the problem input. This enables the user to practice and learn the one problem skill unencumbered with the complexity of implementing all other inputs.

This can be achieved by running the correct values of all inputs—all inputs except the one problem skill —automatically through the program. As an example, if edging were the problem area, only edging would be the sampled user input during this sequence. The user could ignore all other skills and concentrate solely on applying a correct or incorrect degree of edging to see how more edging might sharpen a turn or less would skid-out an otherwise perfectly carved turn.

For students desiring more cognitive involvement or a more thorough explanation, an in depth video explanation can be provided by a more sophisticated system that employs audio/video stored information in the form of a video disc recorder or digital disc unit. This added component is explained below as a further embodiment.

Updating is the last time-interleaving sequence of the program. Erasing the old display and generating a new graphics image, whether it be a computer generated crash, diagnostic display or updated new ski position and user perspective imagery, is the function of graphics updating 154 (FIG. 8).

Updating a video image 156 if the system employs a video recorder, involves accessing the precise video and audio sequence from the video disc recorder when such a sequence is required.

Updating a motion simulator position 158 depends first on the sophistication of the system and whether or not motion simulation is employed. If a motion component is employed, the updating step involves sending position signals or updates to each motion axis. Motion simulation will be discussed in greater detail below.

Finally, if the course or lesson is over 160, the session is terminated 164. If it is not over, the control loop is repeated 162.

Figure 13:
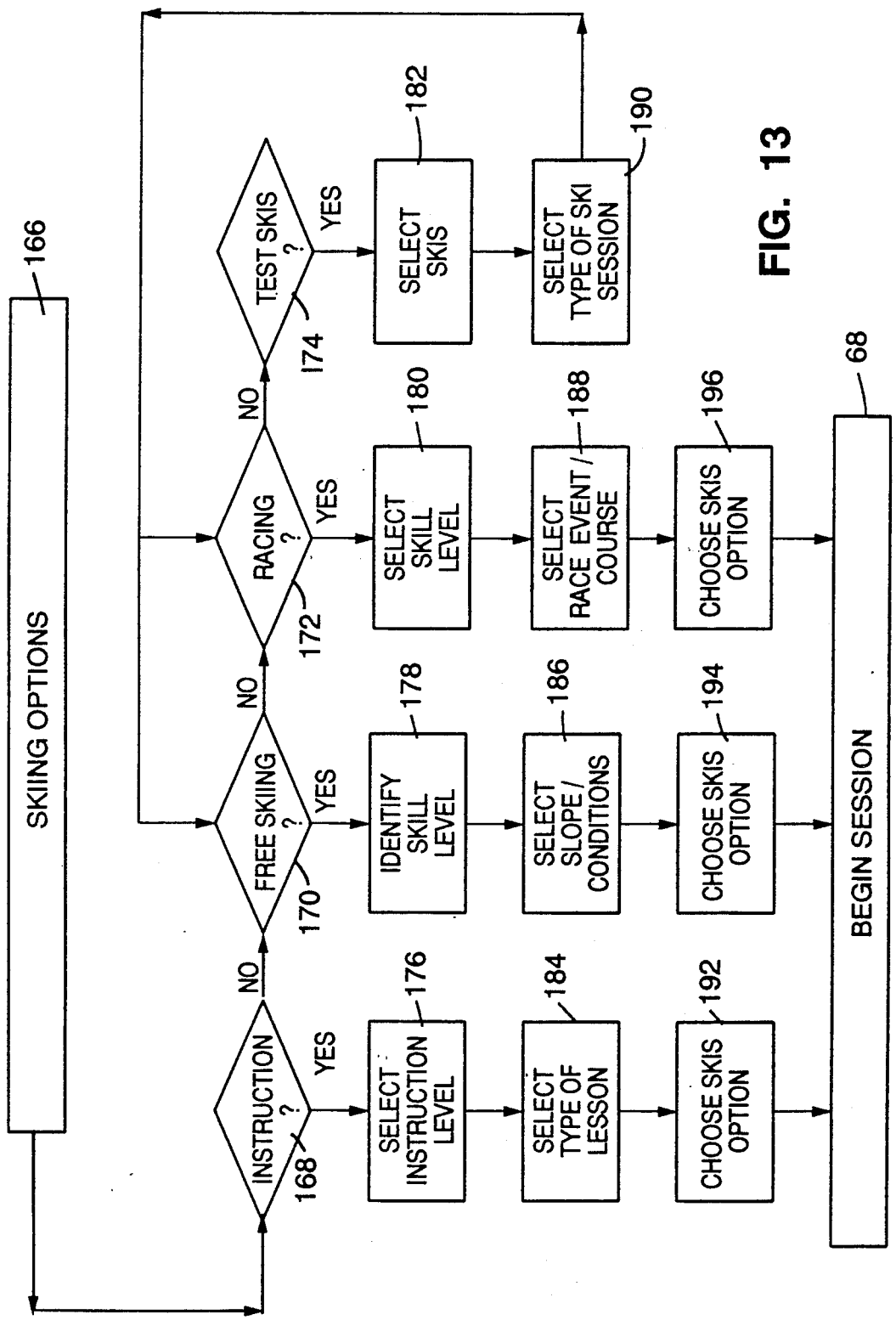
FIG. 13 is a flow chart illustrating a skiing option program for use with the subject ski simulator.

As illustrated in FIG. 13, the present system also affords the user a choice of at least four major skiing options: instruction 168, free skiing 170, racing 172 and testing skis 174. After the ski session is selected, further option parameters can be established. The appropriate skill level identified might also be used to call up the next appropriate option selection (i.e., offer the appropriate slopes or race courses within the user's skill range). The next racing selection allows the skier to choose not only the event, but pick between different courses of the same event 188. During instruction, the skier can choose between different instructional formats. During free skiing 170, different slopes and conditions 186 might be the options.

Figure 21:
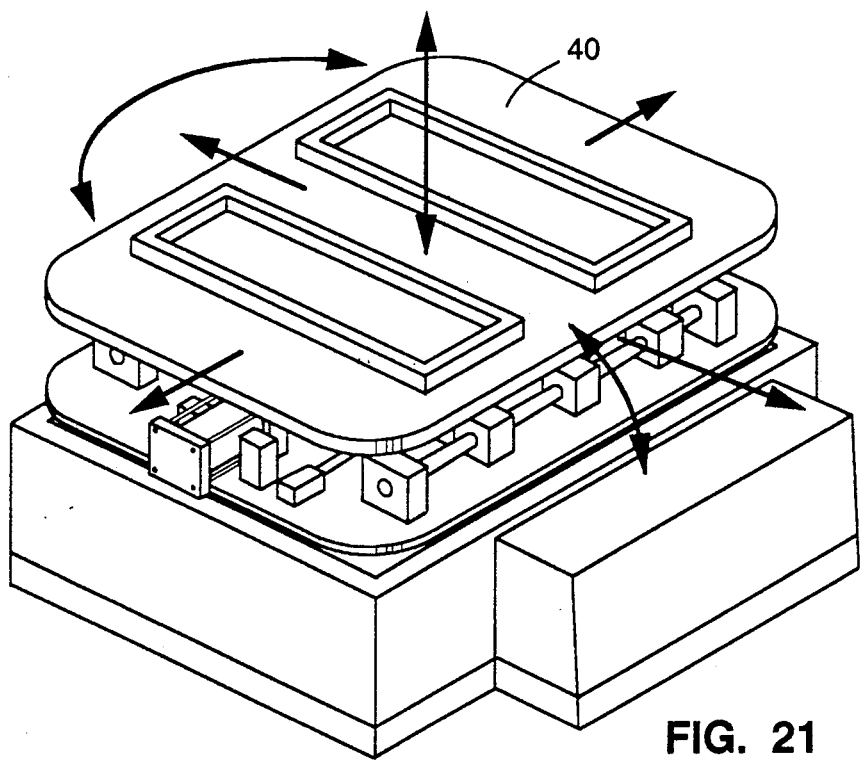
FIG. 21 is a perspective view illustrating a mult-axis physical movement system in accordance with the present invention.

Choosing skis 182 is another selection option. If the user does not want to pick his own skis, the program will automatically choose the best skis, using the user's weight and option selections (i.e. skill level, type of event chosen, etc.) as the determinant. If the user has a specific ski and ski type in mind or is interested in how to select skis or in testing and understanding how different ski types turn and ski, the user would choose this option. After the user selects the desired skis, he can choose either racing 172 or free skiing 170 to test the skis. The user can input all selections by any commercially available input means. The present embodiment uses a five key input device 298 located within the user's reach as illustrated in FIG. 21.

Figure 14:
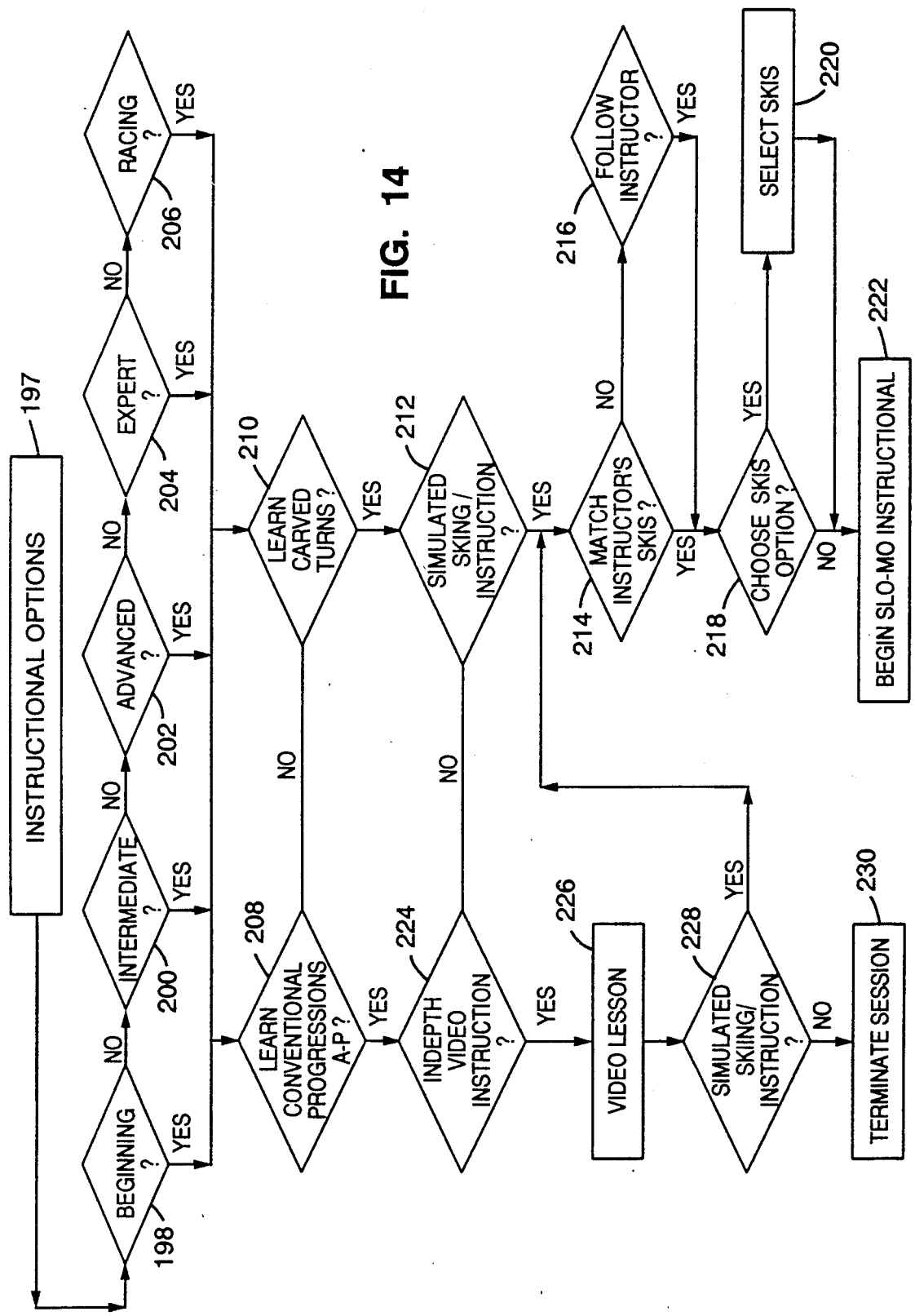
FIG. 14 is a flow chart illustrating the instructional options program for use with the subject ski simulator.

Referring now to FIG. 14, a user can also select an instructional option. If the user chooses conventional progressions 208, in the United States, the user would generally be choosing to learn from the P.S.I.A.'s (Professional Ski Instructors of America) "A–E" progressional format, learning an assortment of transitional turns and techniques (which are essentially the same world wide). Therefore, if the user selects an intermediate lesson 200 he will start in a "C" class format and learn assorted stem turns to beginning parallel. However, depending upon his performance, he might also find himself dropped back to a "B" lesson, and reintroduced to the wedge technique. Conversely, if the user performs well, he would be raised to a "D" class and learn advanced parallel technique. If the user chooses a carved turn format 210, he will automatically be taught straight into carved parallel.

Note, as a beginner, the user would not be expected to carve his turns, but rather, only learn proper carving input. Modern skis naturally turn with proper edge and pressure input or what is established as carving input. Beginner skis are more of the sideslipping variety, skidding arcs rather than carving them. Nonetheless, the arcs that they skid are governed by carving input. Improper carving input in such skis will cause proportionally extreme oversteer or understeer, that is, extreme skidding away from the desired arc. To simplify the lesson, other inputs can be dropped, particularly that of pivoting, which is taught much later in the instruction. Additionally, most other conventional transitional moves can be dropped completely to streamline the user's inputs and concerns.

If the user is a first time skier, timid beginner, and/or the system is not employing the physical movement subsystem, this format can be used to introduce carved wedge turns. Presently, beginners expect and often feel more secure beginning skiing using the conventional "snow plow". A wedge turn has other later application (i.e., used in lift lines and assorted environments to slow down, etc.). Nevertheless, the transitional techniques between wedge and parallel will be dropped (i.e., much of the conventional "B" through "C" lessons).

A user selecting the carving format is taught the two essential skills or fundamentals necessary to carve turns, correct edging and pressuring input. With each successive instructional level (intermediate, advanced, expert, etc.) the emphasis progresses to more advanced and sophisticated input means to fullfil the carving objective. This includes teaching skills that naturally tie into and facilitate the pressuring and edging objectives (i.e., unweighting, balance, angulation, anticipation between turn lateral based movements, steering, etc.) as they naturally arise. This includes teaching more sophisticated measures under increasingly demanding conditions (i.e., higher speeds, steeper slopes, harder snow, ice, etc.), as they naturally arise with increased excellence of the skier, including racing. More in depth descriptions, as with the conventional instruction, can be given during video lessons and/or video diagnostics if used.

After choosing the simulated skiing instruction, the user can opt to match the instructor's skis 214 or follow the instructor down the hill 216. The "matching of skis" and phases of "following the instructor" formats entail pulling back the typical heading perspective to include at least the entire length and image of the user's skis (if not the entire body in some abbreviated or translucent manner). In this fashion the user can see the continuous performance of the tool he uses to carve his turns as he attempts to carve his turns. For further visual feedback reference, supplying the instructor to follow or matching the instructor, ski to ski, is also included. And for still further visual reference, graphically superimposed on the instructor may be the instructor's own internal weight/pressure flow and primary executed point of angulation which he applies throughout each turn.

The continuous and instantaneous association a student can derive identifying his applied input with his computer generated output (i.e., ski performance in relation to slope and instructor) is most effective as pure instructional feedback, seeing himself ski as he skis.

To allow for matching of skis, the program must drop the relative errors of running into the instructor and modify some graphics, but the instructor's path remains the same as does the process and relative error table look-up of the instructor's moment and position. The instructor's internal actions can be graphically superimposed or animated by using a look-up table or nested instancing of this predetermined sequence. Following the instructor might entail following a predetermined route or course, which might also employ the three phases of the turn in highlight. In this fashion, the weaning of the student away from the instructor's internal technique cues and line, to begin basing his applied input solely upon his feedback interaction with the environment and his retention and formation of motor programs of the skiing fundamentals.

A slow motion instructional program 222 can also be selected and uses slow motion which is particularly helpful while learning progressional transitional movements. This allows more time to elapse between execution of the added transitional movements.

As a further instructional aid, a printer can be used in association with the subject simulator. The printer can generate a printout to show how the student fared in the simulation.

Figure 22:
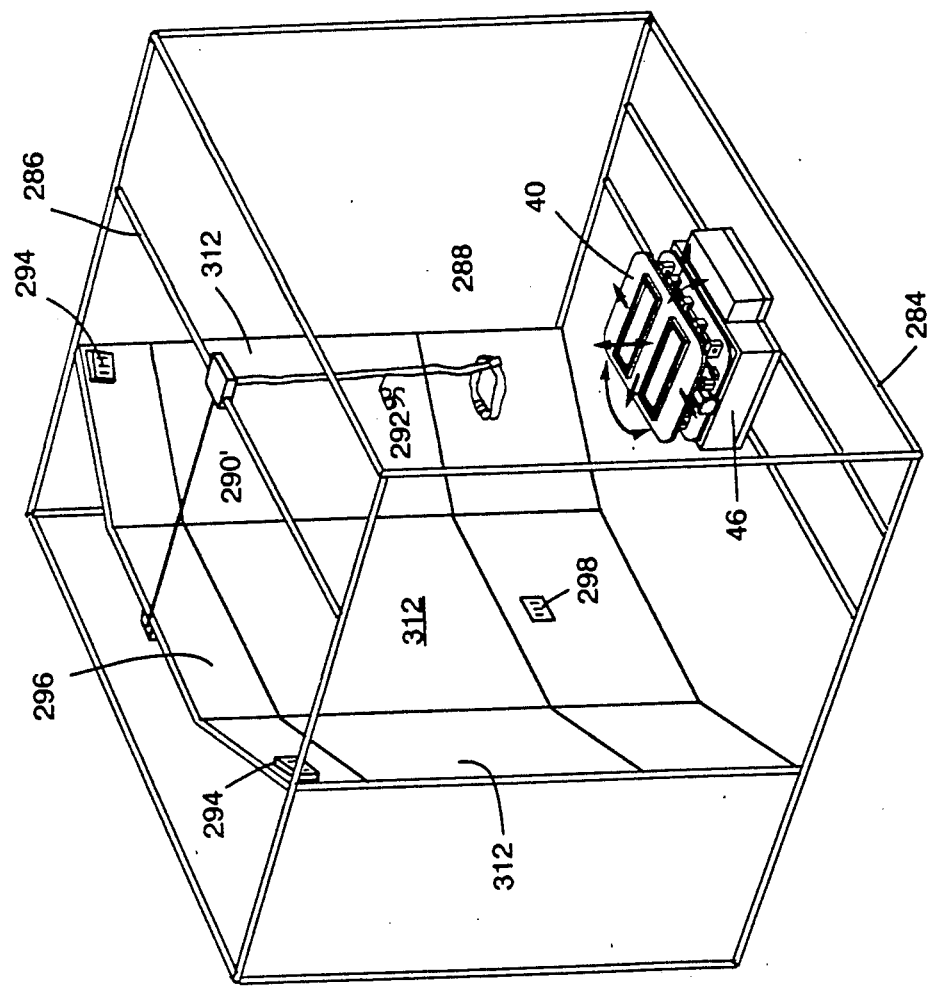
FIG. 22 is a perspective view illustrating an embodiment of the subject invention including an enclosure and accessories.

As illustrated in FIG. 22, a system in accordance with the present invention includes a component 312 for displaying pictures and graphics in response to a signal generated by the computer programs described above. A visual scene can be produced using many of several devices, including a raster scan cathode ray tube to produce an image on a screen positioned in front, or preferably in a semi-circle around the skier. A raster-scan cathode ray tube produces an image through the rapid illumination of discrete points arranged along scan lines. Also useful is a vector graphics system. Additionally, the display system may incorporate a computer generated stereoscopic image to add a depth dimension and, thus, realism to the skiing simulation.

An added accessory component to enhance the display system is the addition of a device (not shown) which stores and transmits audio and video information such as a laser disc recorder or digitally encoded video disc. Laser or video discs, known for their low cost, high density storage and random access speed, can access stored audio and video explanations to provide a more elaborate and cost effective diagnostic explanation and/or instructional description. During instruction, a presimulation, in-depth video lesson might be taught by a world renowned instructor. During instructional simulation, a diagnostic video describing corrective measures for prior errors might also be used. In both cases, the computer accesses the appropriate video/audio sequences for the laser to scan.

For simulation purposes, prerecorded and stored laser disc backdrops of real slope images, including world renowned slopes and race courses, could be provided. Well known racers or instructors' as a laser generated foreground could also be added to the scene. The computer software could initialize and update digitally encoded video frames, sound tracks, and sequences as needed for enhanced audio/video presentation and simulation.

PHYSICAL MOVEMENT SUBSYSTEM

The present ski simulator also includes an optimal motion system responsive to a drive signal generated by the computer software described above. The drive signal corresponds to the output of the turning radius computer program, as well as to pivoting or skiing errors detected by the computer programs.

To new skiers, the foreign sensation of sliding forward often triggers a stiffening of the legs and digging in of the heels to stop from what is psychophysiologically perceived as slipping or falling. This human reaction is interpreted by the skis as an acceleration command, jetting them forward and out from under the skier. Because confidence is critical to all phases of skiing, and because the first few outings if not the first hour will make or break many would-be skiers, the present invention provides for realistic movement sensations to enable new skiers to overcome this reaction without the risk of injury or to assertiveness. Display motion realism is generally the first method employed. This can further be enhanced with stereo vision apparatus, which provides the ultimate in perceived movement through a three-dimensional field (i.e., skiing down a slope). Physical movement is the other methodization to provide accurate motion cues.

The physical simulation sub-system of the the present invention is concerned with correctly stimulating the exteroceptive and proprioceptive senses pertaining to skiing. The vestibular system of the inner ear is critical in sensing overall body motion, position and balance, including linear movement, tilt and body rotation. Additionally, nerve endings in the soles of the feet sense all the varying degrees of exteroceptive or tactile pressure experienced while skiing down a slope, detecting the pressuring and edging feedback from the skier's execution of the skiing skills. The preceptors, found throughout the body in each joint, ligament, tendon and muscle, sense all body positions and movements. This includes sensing all muscle relaxations, contractions, agonistic, antagonistic and synergistic coordinated muscle work used to execute the skiing skills. All the muscle, joint and limb positions and movements that are induced by the environment as the skier skis down the slope executing the skiing skills are also sensed. The sensed information is sent as neurological output signals and transmitted through the nervous system to the brain. However, what is perceived from the signalled sensations is also a product of prior, or lack of prior, experiences associated with the information. For instance, the psychophysical association of sliding by new skiers many times is one of slipping. Due to lack of ski experience, and because of prior slipping experiences, the information seems to warn of an immediate fall, which in turn triggers an instantaneous motor response inappropriate to the occasion, namely stiffening the legs and digging in the heels.

Thus, the first major objective of providing accurate physical simulation is to rid the user of negative mental and physical associations and corresponding reactions to ski-related environmental and/or biomechanical stimuli. However, by no means does this concern end with beginners. Many intermediate to advanced skiers have their progress impeded or halted by conditioning in improper responses to ski-related stimuli. For instance, a steep slope, particularly during the fall line phase of a turn, will intimidate skiers away from executing proper skills and into conditioning-in bad habits or responses, especially if falls have occurred.

Therefore, the physical movement mechanism, by providing a progressively more demanding environment, can flush out technical weaknesses throughout each student's development. While the non-student users will find the system realistic and, thus, immensely challenging, the student users will find that, as they improve, their goal will not be to cognitively learn more or ever-changing skills, but to become more proficient in executing the carving fundamentals, to the point where these skills have become automatic.

The overall objective of the physical movement subsystem can be classified as providing the user with a good replica of the environment and ski situation so as to associate the environment and ski situation during runs down various slopes with their corresponding vestibular, exteroceptive and proprioceptive sensations.

The overall instructional objective can be classified as providing a means for helping the user link the correct exteroceptive and proprioceptive sensations into effective motor programs that enable precise execution of the skiing fundamentals through every phase of the turn under every skiing circumstance.

Beyond the primary goal, there is the clear understanding that cost is a factor and desired levels of sophistication may vary. Those commercial users more intent on providing a strictly entertainment-oriented center might desire less sophistication and, thus, less cost, while those more intent on precise ski instruction might desire more motion sophistication. Most potential buyers would welcome the possibility of a later upgrade.

Thus, the present invention contemplates the use of a variety of compatible axes that can be added to or built upon one primary axis: the rotational axis 232 (See FIG. 1), which makes up the most basic turning system. The axes can be driven by electrical means such as step motors, pneumatic devices or combinations thereof. The preferred embodiment of the subject invention uses hydraulically driven axes. Particularly useful is an electro-hydraulic servo-control system. Such systems ar well-known in the art.

The basic rotational axis 232 is centrally located between skis 22 and simulates a skier's rotational arc through both clockwise and counterclockwise motion. Specifically, this axis simulates the actual heading of the skis moving down the slope, and with proper input, rotating under the skier. The heading and/or rotation is determined by the user's ongoing application of edging, pressuring, lateral-based and/or pivoting input, continuously fed as input values through the modeling equations of the simulation program described above.

From a sensory perspective, with properly applied carving-input, this axis pulls the carving foot and lower body around as the skis pull, and is sensed pulling the lower body around and under a held "square" with respect to the hill/turn and anticipating upper body. At the other extreme, incorrect or pivot-skidding input will cause an appropriate quick swivel-like rotation from this simulator axis, swiveling the user around as would his input cause himself to pivot around under similar on-slope conditions and circumstances.

Figure 15:
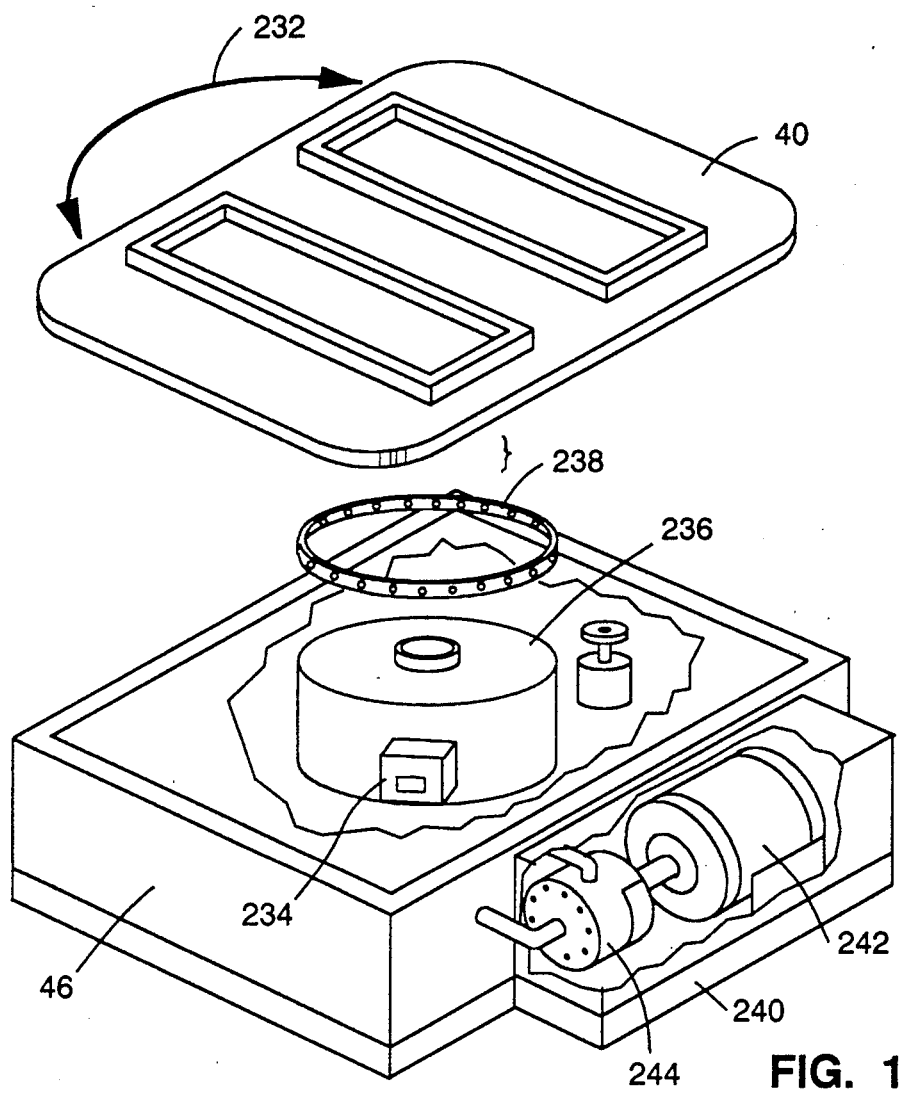
FIG. 15 is a perspective, exploded view illustrating an embodiment of a rotational axis for use with the subject ski simulator.

Referring to FIG. 15, because of the need for precise variable control (i.e., simulating infinite ski-headings, from slow motion instructional turns to rapid pivoted swivels), this axis 232 is servo controlled. In broad terms, the servo loop consists of first measuring platform rotation. The measured rotation is then compared to a command signal representing the desired rotation. The resulting difference produces an error signal that is used to initiate rotational movement that will result in the actual rotation approaching the desired rotation.

As shown in FIG. 15, the working components of the servo system are a servo valve 234 which opens and closes in proportion to the control signal voltage. The servo control valve 234 is housed within base 46 and actuates and drives a motor 236.

The motor can be either a bidirectional actuator motor such as a gear, vane or piston type, or a rotary actuator such as a vane or rack and pinion type 236, can be used to effectuate this axis rotation. For an electrically driven axis, a step motor can be used.

Attached to the output device, more specifically secured to the shaft of the output motor, is a position sensing device such as a potentiometer or optical encoder which produces the signal representing the shaft rotation and, thus, the platform's output position. Also, a tachometer or resolver could be attached to the shaft which would generate a signal representing the shaft's output velocity.

Figure 9:
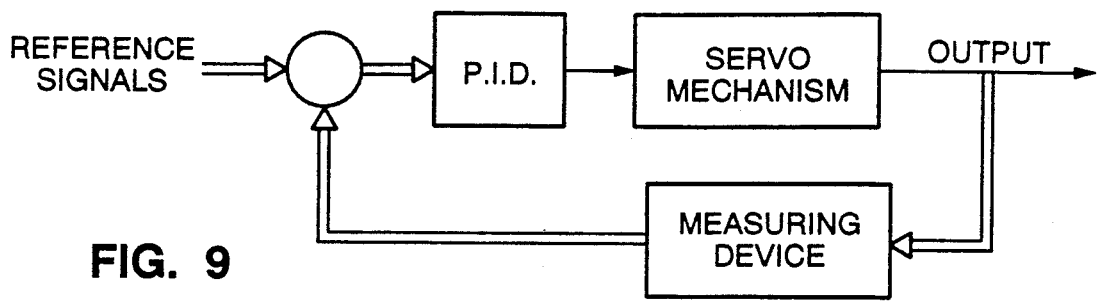
FIG. 9 is a block diagram illustrating a servo loop process for use with the subject ski simulation mechanical computer controlled motion system.

Referring to FIG. 9 which provides a block diagram of the servo loop process, the output, which is the position and velocity of the shaft, is measured by a measuring system. The measurement signals are fed into comparators for comparison with a reference signal. The reference signal or command signal is the desired position, outputted during each motion update step of the control loop. The desired position command generally is the directional heading which has been calculated during a previous step in the control loop. The computer outputs this position command to the rotational axis 232 where it becomes the reference signal. That is, because the servo rate is many times faster than the control rate, to implement the control, the command signal acts as a reference signal or "setting."

The difference between the compared signals, signifying the difference between the desired position and/o velocity (derived from the position command) and the actual position and velocity, produces error signals.

The error signals are fed into a compensator or controller. In the preferred embodiment, as shown in FIG. 9, a P.I.D. (proportional plus integral plus derivative mode control) controller is employed. The controller filters or processes the error signals through the control modes to derive and supply the servo valve 234 with the most effective, i.e. a corrected, command signal/current to eliminate the error signal.

The servo valve 234 opens or closes proportionately to the correction in current. The output motor 236 driven by the corrected fluid flow, rotates the platform 40 toward eliminating the magnitude of the error signal and to simulation specifications.

The preferred controller is an off-the-shelf digital P.I.D. micro-chip. The gains of the P.I.D. block can be chosen by both trial and error and preliminary simulation analysis. A D/A convertor positioned between controller and analog servo valve will convert the digital control signal values into analog voltage values to drive the valve.

A reservoir 240, power motor 242 and pump 244, collectively the power unit, that drives the hydraulic system, is placed behind and bolted to base element 46 in the preferred embodiment. The placement, however, is not critical.

As further shown in FIG. 15, base element 46 can either be level or declined. A static declined base 46 can add to the motion subsystem by more accurately simulating a ski slope. As the heading of a skier changes as he turns in an arc down an angled slope, so does the plane beneath his skis correspondingly change. Thus, the declination of the simulator base 46, positioned underneath the rotational axis 232, provides a simulated slope angle, and with rotation provides another essential dimension of depth to the turn in progress. Thus the ever-changing plane beneath the user's skis is accurately simulated. This combination of declination and controlled rotation will cause a continual repositioning of the "uphill" and "downhill" skis—or repositioning of each foot, knee and hip. Generally, the repositioning itself is subtle in nature and does not lead to direct loss of control or balance. However, the slightest shift in weight between toe and heel, or release of edge, will cause dramatic changes in ski response, which easily can snowball into major control or balance problems.

Figure 16:
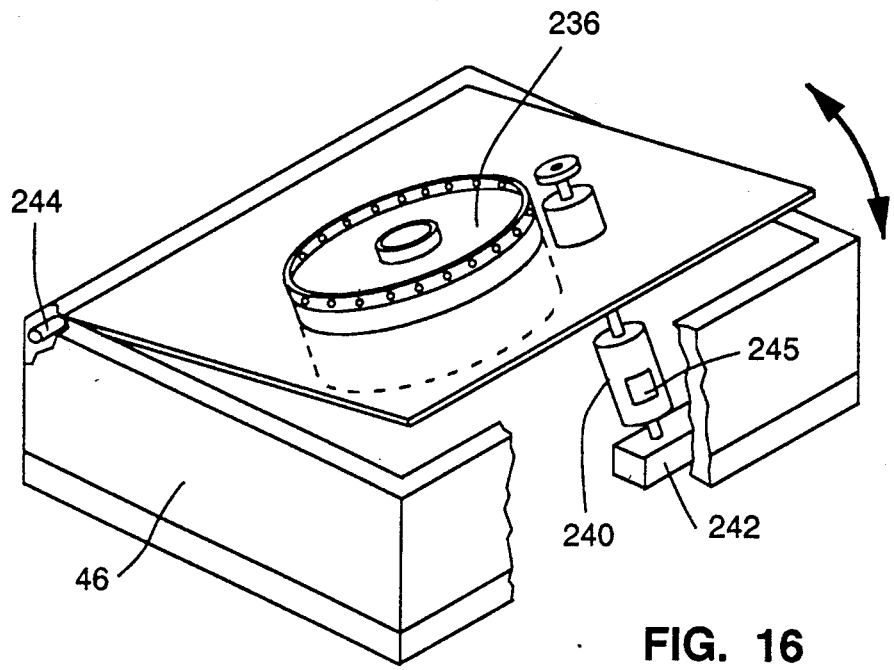
FIG. 16 is a perspective, exploded view illustrating an embodiment of a slope-angle axis for use with the subject ski simulator shown without a skier platform.

Referring now to FIG. 16, a slope angle axis for use with the subject ski simulator can be seen. The slope angle axis can be added to the subject invention to further enhance simulation of environmental conditions. The slope angle axis is located substantially perpendicular to the rotational axis 232 and serves to move platform 40 (not shown) at an angle upward and downward. This can be accomplished using a cylinder 240 which is pivot or swivel mounted to block 242 resting on the floor of base 46 to adjust for and produce the desired angular motion with the assistance of a fixed axle 244 or hinges located in the anterior portion of the top face of base 46. The control valve 245 drives the cylinder 240 and axis to the appropriate position via actuation from the computer program as described above. For free skiing and racing applications, this axis will simulate varying slope angles to accurately simulate well-known race courses or ski slopes (i.e., simulating their particular slope variations).

For instructional applications, varied slope positions can be added. The steeper the angle, the more extreme will be the diverging plane beneath the skis. Thus, more proficient body control and awareness to applying the basic skills will be needed. Additionally, steeper slopes naturally demand more ski-to-snow precision (i.e.. input precision that the simulation program will also demand). Third, the slope angle axis can be used to provide more intimidating slopes. Steep slopes arouse a natural psychophysical aversion since the skier must lean down the fall line or forward and seemingly over a precipice in order to stay in balance over the skis. While intimidation caused by steep slopes generally does not go unnoticed, the specific and resulting technical errors generally do.

As discussed above, on-slope instructors can only use visual cues to detect errors. Often, skiing errors are not readily visible. Weighing, an invisible force, can only be detected by the process of deduction. Only if a skier's body is visually out of position will an instructor deduce that his weight is also out of position. Unfortunately, only extreme errors can be detected in this manner. More critical, however, is that the weighing/pressuring actions which contribute to each turning phase (i.e., the timing of weight placement/displacement, the amount of weight/pressure applied to each ski, the point of placement, subtle pressure shifts, etc.) go undetected for evaluation purposes. Eve- knee and hip angulation, though more explicit, results of an edge-angle "edged into the snow, are not visually distinguishable from other edge-angles, each of which can dramatically affect the turn in progress.

Hence, may intermediate skiers fail to progress on the steeper slopes. Input errors may not be visually apparent. In fact, students may perceive that the fundamentals are being properly executed when in actuality, instead of a quick and aggressive weight and edge change, comes a weak and indecisive edge change. Instead of committing the upper body down the fall line and pressuring the toes to begin the turn, trepidation has shifted weight/pressure back to begin the turn on the heels, and, thus, the skis' tips wash out. All these visually imperceptible errors, which an on-slope instructor might not catch, the simulator immediately detects, simulates, diagnoses and suggests the appropriate corrective action to be taken.

Figure 17:
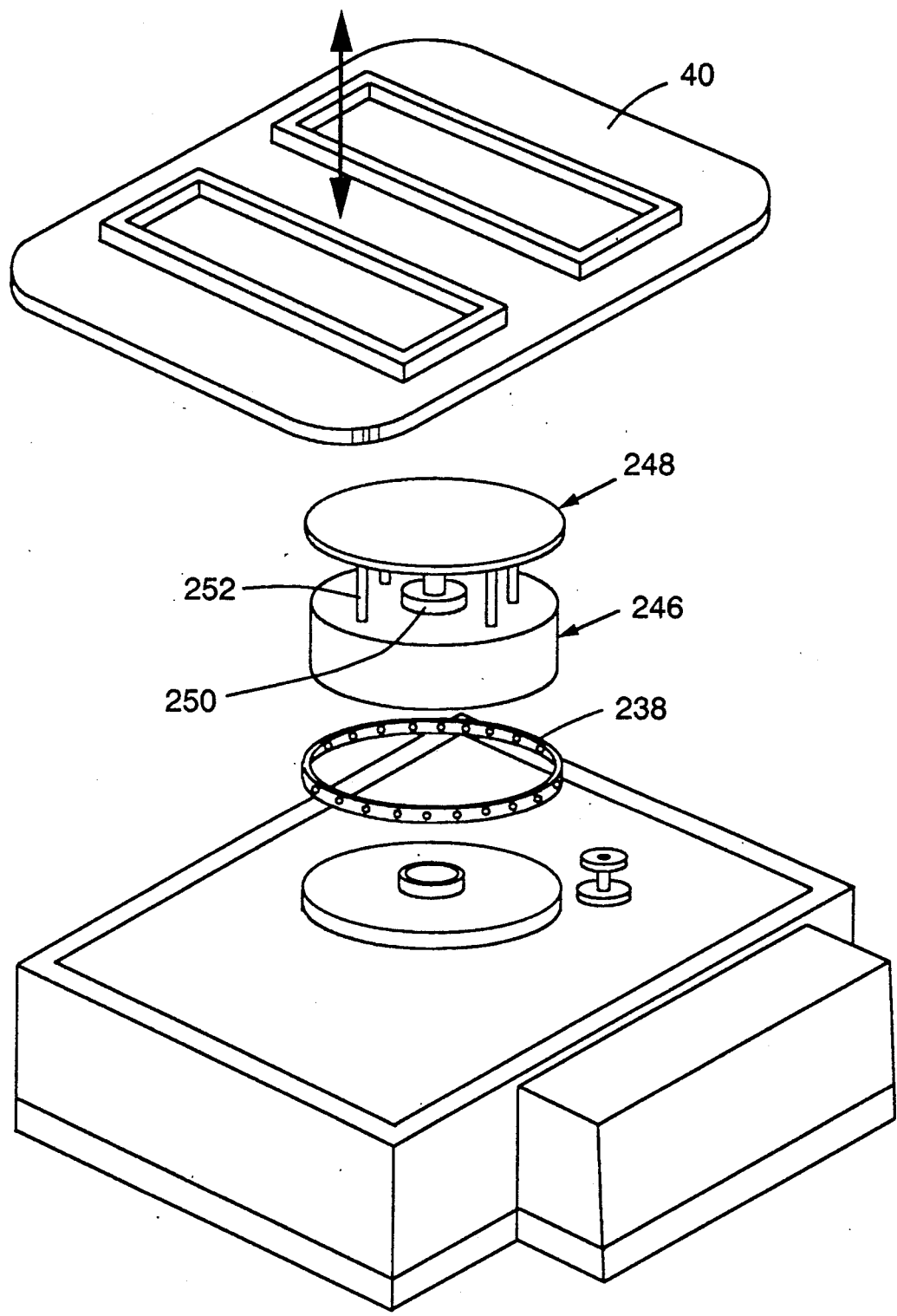
FIG. 17 is a perspective, exploded view illustrating an embodiment of a vertical axis for use with the subject ski simulator.

FIG. 17 illustrates another optional axis, a vertical axis to simulate extreme terrain features. The vertical axis includes a cylinder housing 246 seated directly onto the thrust bearing ring-238 and bidirectional motor shaft displacing the rotational platform 40 which is positioned above and secured to a piston and rod guide assembly 248 of an actuating cylinder 250. Guide rods 252 compensate for eccentric loading applied by the user while skiing on rotational platform 40.

Vertical lift simulates moguls and other jutting topography, while vertical drop simulates cliffs and other drop-offs found in such events as downhill or dual racing. Also provided by the vertical axis is a dampening sensation for powder and "crud" snow conditions.

Instructionally, this axis is ideal for teaching the user how to ski over moguls. Moguls require timed and almost total lower body relaxation. This motor action is difficult for many skiers to accomplish. The natural tendency is to brace the lower body for impact and stiffen the legs to iron-like rigidity for the approaching mound. The objective of the motion axis is to coax the body out of the stiff response and into the desired timed relaxation. While no easy task on the slope, it is easily accomplished on the simulator. Because the vertical axis is used to simulate many environmental situations—moguls, drop-offs, ruts, etc.—of varying degrees and sizes as well as deliver various instructional options such as slow-motion, a servo control valve (not shown) is employed to control the various rates of fluid flow to actuating cylinder 250.

Figure 18:
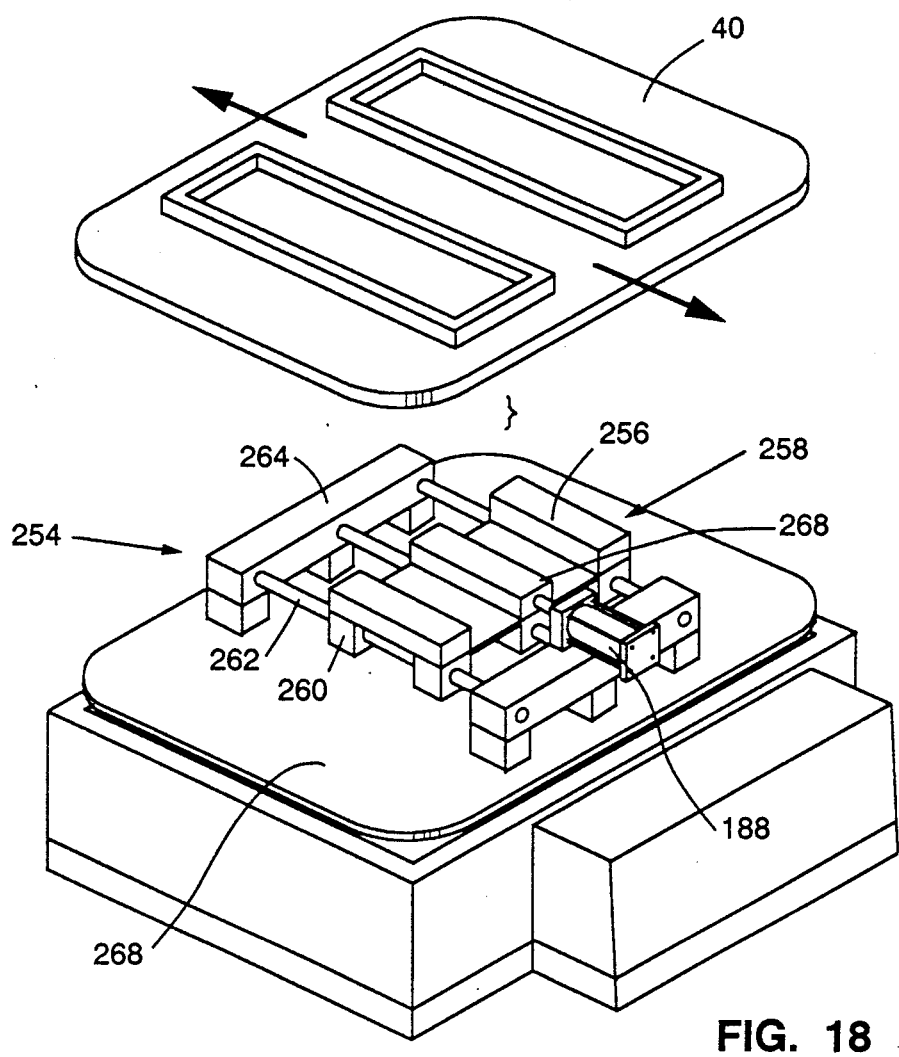
FIG. 18 is perspective, exploded view illustrating an error simulating axis for use with the subject ski simulator.

FIG. 18 illustrates an error simulating axis for use with the subject invention. The longitudinal primary error simulating axis is located beneath and running in the same direction as skis 22. This axis provides a forward and backward thrust movement in response to user error detected by the computer system.

The skier platform 40 is secured to a roundway (or rod) and linear bearing system 254. The skier platform 40 is bolted to support beams 256 of a linear axis carriage 258. The linear axis carriage 258 is mounted on bearing pillow blocks 260 which travel linearly on the roundways 262 between bearing and roundway support modules 264. Support blocks secure the bearing and roundway system to axis mounting plate 265.

The end fitting of a cylinder piston rod 268 is bolted to the center support beam 256 of the linear axis carriage 258 to effectuate and control the desired forward-/backward movement on the free-moving bearing system. The cylinder 138 in this embodiment, is double acting and is controlled by a servo control valve (not shown).

The actuated movement is measured by a linear position sensing device. Depending upon the user's error and system objectives, any incremental thrust or continuous movement in either direction can be outputted by a command signal and actuated by the servo system. The fastest way to determine and output the desired command signal is to either precalculate position values and store them in a look-up table or to mathematically approximate the function to be triggered by improper input.

For safety as well as practicality, this system uses unitary axis motion for both feet rather than independent axis movement for each foot. Nonetheless, independent movement is within the scope of this invention. Independent movement can be accomplished by placing individual rod and bearing systems beneath each ski.

Detection of extreme weighing, pressuring, or edging errors may trigger a forward or backward thrust/movement from this axis and continues to do so with improper input. The axis simulates the natural chain reaction of balance problems caused by input errors. Skis respond to the errant input, producing varying degrees of balance problems, by moving from slightly out of position to completely out from under the skier.

Once the skis move out of position under a skier, forcing the skier off balance, his ensuing off-balance/-out-of-position input will cause either a worse position, which in turn throws the skier further off balance to again apply worse inadvertent input, etc., or his "lost" balance acts as dead weight and keeps the skier locked on the tails/tips until a crash ensues or a dramatic recovery is made.

It is quite apparent that a display system alone can only register or display that an initial balance type error has been made. It cannot provide the natural output consequence of such an error—throwing the user out of position and/or off balance for him to either battle back, or find himself facing worse position/balance problems. Without this natural error response, the simulation loop is broken.

The primary error axis need not be used at all times. To many beginners already off balance, getting thrown more off balance makes learning the fundamentals much too difficult. Therefore, by not actuating this axis, a grace period can be provided. Thus, skiing is dramatically simplified for new skiers, allowing the beginner to practice and learn the working skills unimpeded. In this fashion, learning the fundamentals is greatly enhanced and the entire learning process speeds up. Skiing can much sooner become a predictable rhythm of specific muscle contractions and relaxations that can easily become neurologically patterned into the first of a long line of continually more effective motor programs. Because movement becomes predictable with no unexpected loss of control/balance, conscious direction becomes more willing to hand over control to the motor program, to begin the involuntary muscle execution of the fundamentals.

After the user has reached this initial state and shown a degree of proficiency in executing the fundamentals, the error axis can be triggered for action. In this manner, each student can begin an unimpeded motor program and condition in the fundamentals to a programmed performance level before the error axis is triggered. Once triggered, the user is equipped with a correct motor response. Thus, not only is this axis preparing the user for the real world experience of losing control/balance, but the axis can be an integral part of the instructional process. The instructional format is set up so that simulator students will virtually be forced to run an involuntary version of the motor rhythm that proved successful (i.e. had been positively reinforced during simplified skiing sessions).

Avoidance learning (as opposed to the above "escape learning") is also rearranged in this fashion. Errors triggering immediate negative feedback or "punishment" can be an effective deterrent to the execution of improper input. However, when beginners find themselves punished with loss of control/balance, what they initially receive is little more than random abuse until they can differentiate between proper and improper input and correlate the loss of balance/control with specific input. The error axis can eliminate this initial phase of "random abuse". Hence, by holding back escape and avoidance learning until the student has a running start at establishing where to escape to and what to avoid, much initial chaos is eliminated, and efficient skill execution in the briefest time frame is maximized.

Though this longitudinal axis is the primary or extreme "error simulating axis," the rotational axis, vertical axis, and a lateral axis (to be discussed below) are also employed, sometimes in unison, to simulate results of input errors. Likewise, the forward/backward movement of this axis will not always be employed to simulate responses to input errors. For instance, it may simulate an acceleration movement, a jetting forward of the skis, that only the most experienced skiers can apply and trigger.

Figure 18A:
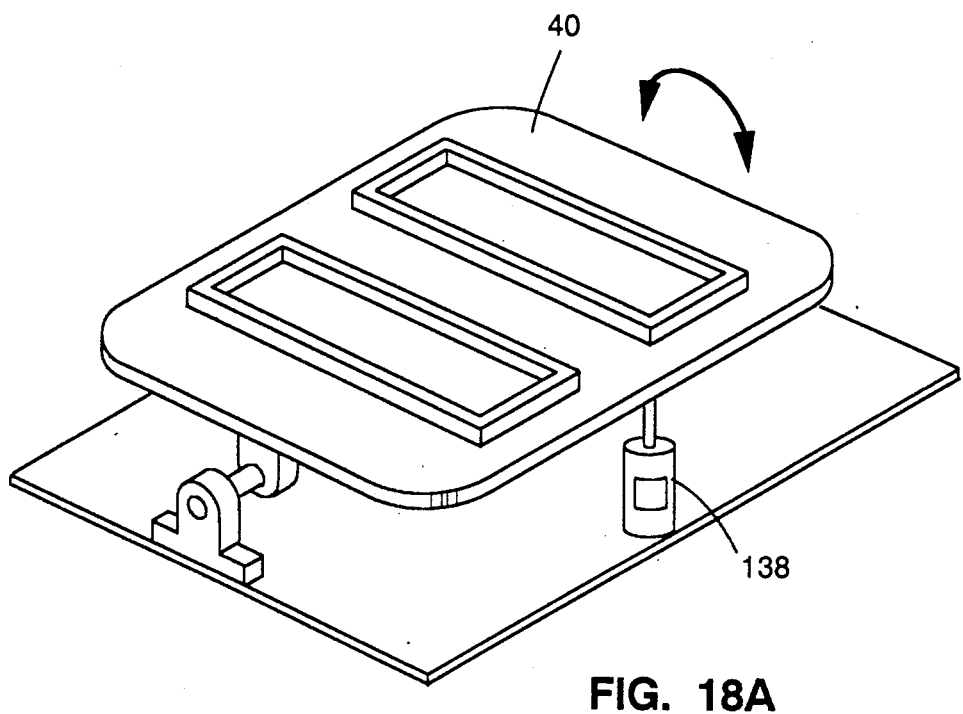
FIG. 18A is a perspective view illustrating an alternative error simulating axis.

An alternative longitudinal error axis, shown in FIG. 18A, comprises the following: the platform 40 mounts not on linear traveling carriage system but balances on a single axle bisecting the platform. Upon error input, the cylinder's piston rod causes not forward/backward linear movement of varying degree, but causes the platform to tilt forward or backward to varying degree. The cylinder 138 must be positioned standing upright and underneath the tail end of the platform edge to push/pull rear end of platform 40 incrementally up/-down, or appropriate linkage must be employed with existing positioned cylinder.

Though less accurate in simulating the skis actual on slope response, the end result to the user is quite accurate. If the user is out of position or off balance in some fashion, only the slightest incremental vertical drop, tilting slightly forward or slightly backward is all that is needed to close the loop and throw the user proportionately off balance to his input.

It is also contemplated that this tilting error system could be activated not by a computer drive signal, but by the simple mechanics and biomechanics of the user trying to sustain a level platform which will freely tilt forward or backward without proper balance execution.

As an example, during instruction, the cylinder could simply be used to release the rear end of platform and, thus, release the stabilization of the platform, allowing the user to graduate up to practicing his longitudinal balance as he executes proper ski technique. For the economical home version embodiments, the hydraulics and cylinder could be eliminated and this axis could be classified more as a free tilting base-support for the foot controlled input devices or skis, rather than as a computer controlled movement subsystem.

Figure 19:
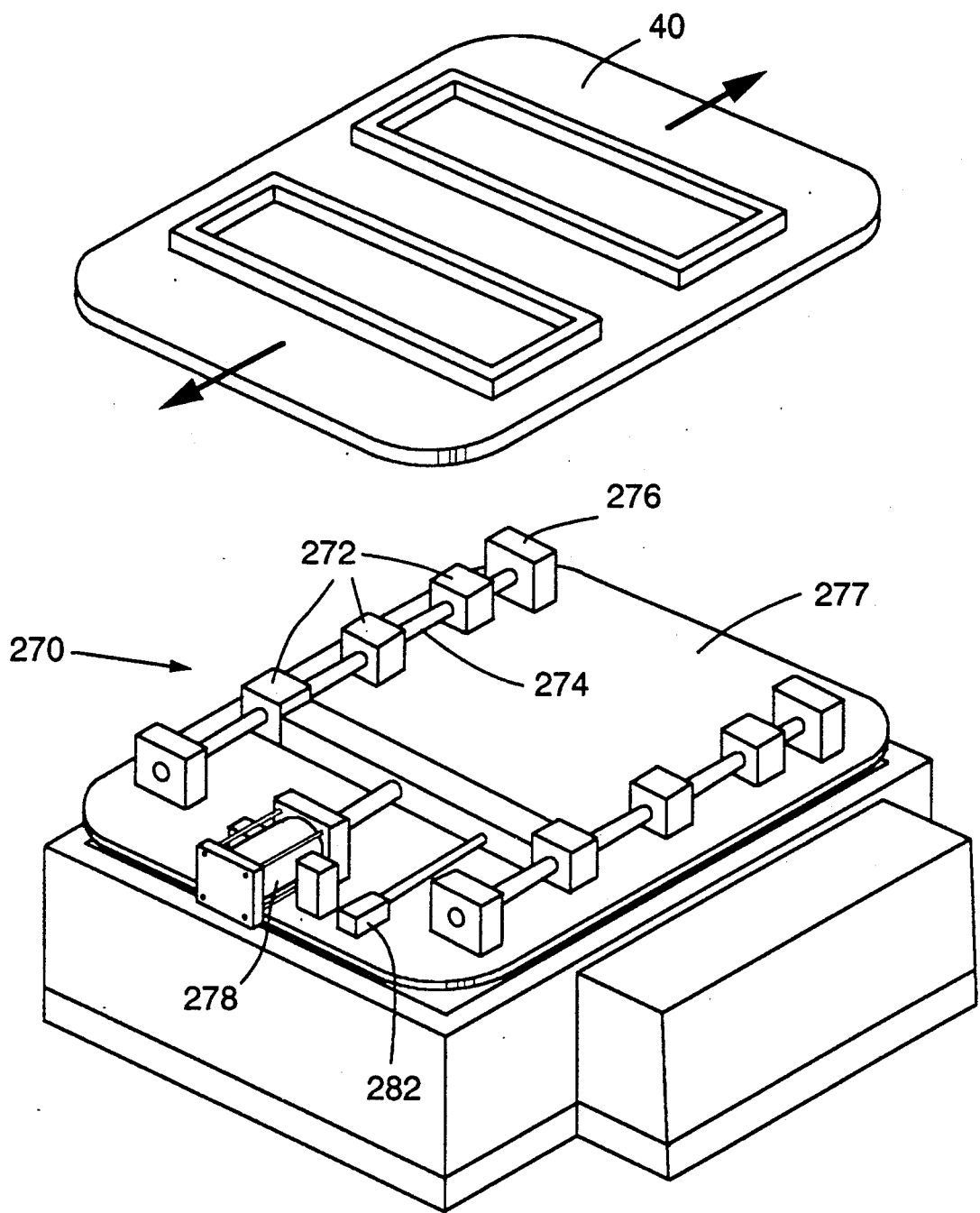
FIG. 19 is a perspective, exploded view illustrating a lateral axis for use with the subject ski simulator.

Referring now to FIG. 19, another motion axis is illustrated that can be used to deliver a lateral or side-to-side freedom of movement similar to the error axis' forward/backward linear movement. This axis, termed the lateral axis, is generally used in combination with the rotational axis. Positioned directly under the skier and running perpendicular to the skis 22, this axis moves horizontally out or in, in combination with the rotation, to produce sophisticated motion cues of skidding, angulation, as well as produce a variety of turn shapes.

Beyond pivoted-swiveling, skidded turns also washout laterally, meaning the lateral axis would travel outward with the rotation to help cue the feel of this skidding action and turn shape deformation.

To sharpen the shape of turns, this axis must simply be pulled in with carving rotational movement. Only the initial change in movement is needed to "cue" these ski actions and, thus, very little actual lateral movement must take place; this is particularly true when accompanies with visual cues.

Nonetheless, the precise circular arcs produced by the rotational axis can be altered into infinite shape variations within a retrievable left and right turn envelope. The retrievable action to center point is accomplished primarily during the transition between turns. The retrieving action itself can help cue the initial ski to snow contact feel. And by continuing on, moving the platform off center laterally a few centimeters this will cue the off center independent feel of skiing. When a skier turns, because of primarily his angulation and his inward lean held up by centrifugal force, the turning axis is positioned off center under the skier. The outside ski carves the longer radius while the inside ski takes the shorter route. Because each ski travels different rotating distances and speeds, in this fashion the independent feel of independent ski-action is cued. The other onset ski actions can be cued with lateral movement from this slightly off center position.

Platform 40 can be secured to a lateral axis roundway and linear bearing system 270. Platform 40 bolts onto appropriately spaced bearing pillow blocks 272 which ride freely on roundways 274 between foundation blocks 276. For added support, a continuous rail, positioned beneath roundways 274, can also be used. The foundation blocks 276 are secured to an axis mounting plate 277.

A double acting cylinder 278 is bolted to an axis-beam 280 to effectuate and control the desired lateral or y-axis movement of this motion axis. The cylinder 278 is driven by a servo control valve. With the help of a linear feedback device, such as a linear encoder 282, any lateral movement in either linear direction can be actuated and controlled for real time application.

Now that the error axes have been described sufficiently, an exclusive error system is also be disclosed. The error system consists of either the longitudinal error axis (either the linear traveling or vertical tilting system) or the lateral axis, or preferably both axes.

All produced movement would be indicative of user error. Certainly the actuation of the longitudinal axis would be self-explanatory. Loss of balance is universally interpreted as the result of improper behavior/circumstances. Lateral movement though less "survival-based" would simulate that the turn is washing out from the firmest foot hold that is produced by the solid carve-turn base (and exaggerated on this system to a solid non-movement base).

Because the results or ski responses from improper position and balance over the skis, as well as results from technical errors, cause equal if not more dramatic results for the skier as those positive motion and feel cues resulting from properly turning skis, the basic error system is as effective if not more effective than the basic one axis turn system.

Figure 20:
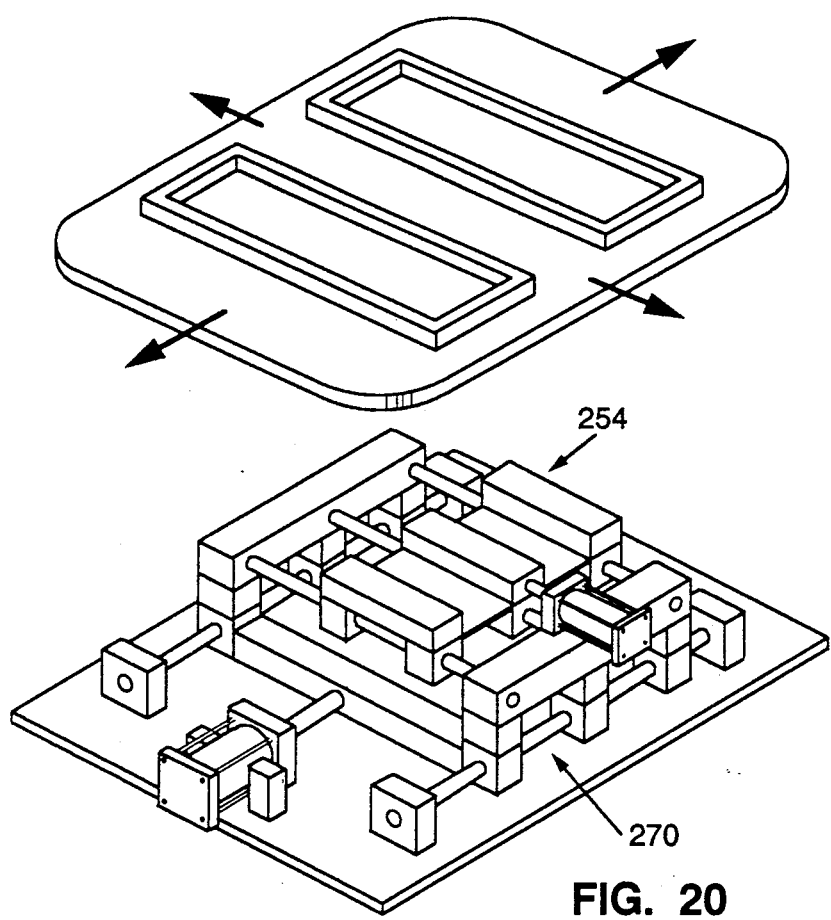
FIG. 20 is a perspective, exploded view illustrating an embodiment of the present invention combining an error simulating axis and a lateral axis.

FIG. 20 illustrates an exclusive error system, the combination of the lateral and the longitudinal axis. In this embodiment, error roundway and linear bearing system 254 is mounted above lateral axis roundway and linear bearing system 270.

FIG. 21 shows an embodiment of the invention which provides a multi-axis physical movement system.

As illustrated in FIG. 22, the overall ski simulation system can be enclosed and supported by a steel enclosure or cabinet 284. Enclosure 284 includes a support beam 286. Secured to the support beam 286 and directly over the user, is a self-adjusting safety belt, or harness 288.

If stereo vision or a three-dimensional display enhancement is employed, a protected cord 290 to stereoscopic glasses 292 will also be looped over support beam 286 and linked for added protection to safety belt 288.

Other accessory items include two variable speed electric fans 294 which blow varying amounts of wind in the skier's face to help cue varying skiing speeds. In this embodiment, the fans are secured on a display cabinet 296 or to a more forward support beam 286. Display cabinet 296 holds screens 312 for displaying pictures and graphics in response to the signals generated by the computer programs described above.

Input keys 298, employed to select ski session options, and connected with the computer software, can be situated in any convenient location. The present embodiment employs two sets, one set positioned on cabinet 296 and another on top of handle grips 300 of ski poles 302.

Figure 23:
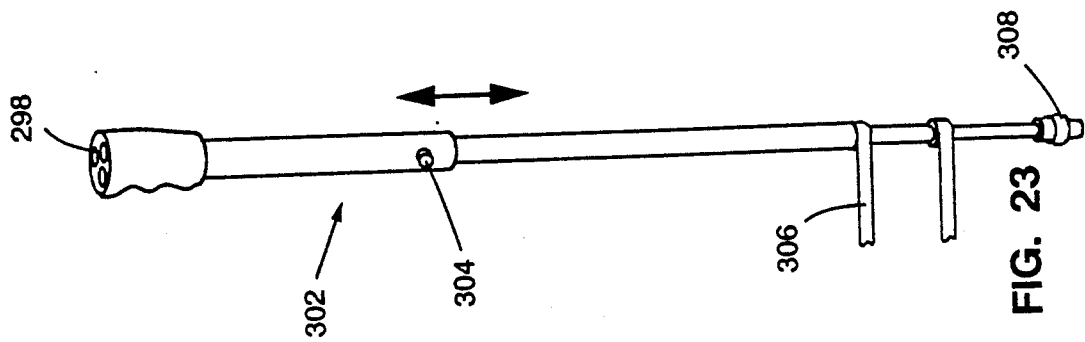
FIG. 23 is a perspective view illustrating a ski pole for use with the subject invention.

As best illustrated in FIG. 23, adjustable ski poles 302 employ cotter pin or screw-down actions 304 to lock into the appropriate length for the user. Paired nylon straps 306 attach each ski pole to the motion simulator base to provide for free mobility within a desired range. The straps 306 are also employed to protect the wiring of the input keys 298 and a plunger switch 308 secured to each ski pole. Plunger switch 308 is a high impact plunger type momentary switch to signal the precise time that the pole 302 is planted on a pedestal 310 (FIG. 21) adjacent to base 46. Pole-plants can be critical to the timing of turn initiation.

To ensure a true private lesson, particularly for those more self-conscious students, a curtain, sliding doors, or other enclosing means can be included. In this way, an entire ski simulation system is provided.

It is further contemplated that the input devices which can employ portions of actual snow skis, i.e., snow skis' midsection, as the foot controllers, with little modification the input devices could be lengthened to include the entire length of skis, complete skis. For example the base and input device sensing system of the subject invention could be modified in this fashion to be employed as a combination simulation and ski rental mounting base. After the ski renter has had his bindings fitted, he could receive a dryland simulation lesson/ski run before taking his rented skis out onto the slopes.

The scope of the subject invention naturally would also include other "bending-beams" such as skateboards or mono skis (dropping one foot controller and configuring software to match the specific skateboard's or mono ski's make and model as practiced with each employed make and model downhill ski is essentially all that would be modified).

Thus, a user interactive ski simulation system has been disclosed. Although a preferred embodiment of the system has been described in some detail, it is understood that obvious variations can be made without departing from the spirit and scope of the invention as defined by the appended claims.

What is claimed is:

1. A foot-controlled input device responsive to pressure applied thereto by a user for providing a control signal to a computer system, the foot-controlled input device comprising:
   (a) multi-variable pressure sensing means comprising at least one multi-variable pressure sensing element responsive to variations in pressure applied thereto for generating a continuous output signal indicative of the variations in applied pressure; and
   (b) a foot-controlled element overlying the multi-variable pressure sensing means such that pressure applied thereto by the user causes proportional pressure to be applied to the multi-variable pressure sensing means.

2. A foot-controlled computer input device as in claim 1 wherein the pressure sensing means includes means for sensing variations in vertical pressure applied thereto.

3. A foot-controlled computer input device as in claim 2 wherein the pressure sensing means further includes means for sensing variations in pressure applied downwardly on either edge of the foot-controller means.

4. A foot-controlled computer input device as in claim 1 wherein the pressure sensing means includes means for detecting variations in vertical pressure applied along the length of the foot-controller means.

5. A foot-controlled computer input device as in claim 1 wherein the foot-controller means comprises means for sensing torsional pressure applied to the foot-controller means.

6. A system as in claim 1 wherein the sports equipment element comprises at least one ski and the computer system comprises diagnostic means for generating a diagnostic output in response to the control signal.

7. A foot-controlled computer input device responsive to pressure applied thereto by a user for providing a control signal to a computer system, the foot-controlled computer input device comprising:
(a) a platform
(b) multi-variable pressure sensing means positioned on the platform for sensing variations in pressure applied thereto for generating an output signal corresponding to the applied pressure; and
(c) at least one foot-activated controller connected to the multi-variable pressure sensing means such that pressure applied to the controller causes the controller to apply proportional pressure to the multi-variable pressure sensing means,
the output of the multi-variable pressure sensing means being utilizable as an input to a computer system.

8. A foot-controller computer input device as in claim 7 wherein the signal generated by the pressure sensing means is an analog signal.

9. A foot-controlled computer input device as in claim 7 wherein the signal generated by the pressure sensing means is a digital signal.

10. A foot-controlled computer input device as in claim 7 and further comprising tilting means connected to the platform for providing tilt motion to the platform and thereby to the foot-activated controller.

11. A foot-controlled computer input device as in claim 10 wherein the means for sensing shear pressure comprises a strain gauge.

12. A foot-controlled input device as in claim 11 wherein the strain gauge is an element of a multielement rosette.

13. A foot-controlled computer input device as in claim 10 wherein the means for sensing shear pressure comprises a strain gauge transductional element of a multielement force transducer.

14. A foot-controlled computer input device as in claim 10 wherein the means for sensing shear pressure comprises a piezoelectric washer of a multicomponent washer system.

15. A foot-controlled computer input device for providing input signals to a computer system, the input device comprising:

(a) a platform;
(b) first and second vertical pressure sensing means positioned on the platform and responsive to variations in vertical pressure applied thereto for generating first and second vertical pressure output signals, respectively, indicative of the vertical pressure applied thereto;
(c) first and second edging pressure sensing means positioned on the platform and responsive to variations in edging pressure applied thereto for generating first and second edging pressure output signals, respectively, indicative of the edging pressure applied thereto;
(d) a first foot-controlled member overlying the first vertical pressure sensing means and the first edging pressure sensing means such that vertical pressure applied to the first foot-controlled member causes proportional vertical pressure to be applied to the first vertical pressure sensing means and edging pressure applied to the first foot-controlled member causes proportional edging pressure to be applied to the first edging pressure sensing means; and
(e) a second foot-controlled member overlying the second vertical pressure sensing means and the second edging pressure sensing means such that vertical pressure applied to the second foot-controlled member causes proportional pressure to be applied to the second vertical pressure sensing means and edging pressure applied tot he second foot-controlled member causes proportional edging pressure to be applied to the second edging pressure means,
the first and second vertical pressure output signals and the first and second edging pressure output signals being provided as input signals to the computer system.

16. A foot-controlled computer input device as in claim 15 wherein each of the first and second vertical pressure sensing means and each of the first and second edging pressure sensing means comprises analog sensing means.

17. A foot-controlled computer input device as in claim 15 wherein each of the first and second vertical pressure sensing means and each of the first and second edging pressure sensing means comprises variable resistance sensing means.

18. A foot-controlled input device as in claim 15 and further comprising securing means for securing the first and second foot-controlled members to the platform wherein the securing means comprises a securing plate having fore and aft ends, the securing plate positioned beneath the first and second foot-controlled members, the securing plate secured to the platform in the fore end of the securing plate to define a pivot axis, the securing plate further defining apertures in the aft end to match apertures formed in the platform for positioning the first and second foot-controlled members with respect to one another.

19. A foot-controlled input device as in claim 18 wherein the securing plate further comprises an angular sensing potentiometer positioned in the fore end pivot axis of the securing plate.

20. A foot-controlled computer input device, that is foot-activated by a user, for providing input signals to a computer system, to device comprising:
(a) at least one platform;

(b) vertical pressure sensing means positioned on the platform and responsive to varying degrees of vertically applied pressure input for generating a corresponding vertical pressure output signal;

(c) edge position sensing means positioned on the platform and responsive to varying degrees of applied edge position input for generating a corresponding edge position output signal (d) at least one foot-controller means having the vertical pressure sensing means and the edge position sensing means connected thereto such that varying degrees of vertical pressure and edge position input applied to the foot-controller means cause the foot-controller means to exert proportionate vertical pressure and edge position input of the vertical pressure sensing means and edge position sensing means, responsively, the vertical pressure output signal and the edge position output signal being provided as input signals to the computer system.

21. A foot-controlled computer input device as in claim 20 wherein the foot-controller means comprises a pair of skis.

22. A foot-controlled computer input device as in claim 20 wherein the pressure sensing means further comprises means for sensing shear pressure applied to the at least one foot-controller means.

23. A foot-controlled computer input device as in claim 22 wherein the means for sensing shear pressure comprises means for measuring lateral and torsional pressure applied to the at least one foot-controller means.

24. A foot-controlled computer input device as in claim 22 wherein the means for sensing shear pressure comprises means for measuring longitudinal pressure applied to the at least one foot-controller means.

25. A system for monitoring the performance of a user of board-type, foot-controlled sports equipment, the system comprising (a) a board-type sports equipment element having physical characteristics such that variations in pressure applied to the element by the user cause corresponding variations in the directional heading of the sports equipment element;

(b) variable pressure sensing means connected to the sports equipment element and responsive to variations in pressure applied thereto for generating a continuous control signal that varies in proportion to the variations in pressure applied to the sports equipment element by the user; and (c) a computer system that includes:
(i) storage means for storing information that defined directional heading criteria of the sports equipment element;
(ii) processing means for processing the control signal generated by the variable pressure sensing means to determine whether the variations in directional heading of the sports equipment element caused by variations in pressure applied to the element by the user are within the directional heading criteria; and
(iii) means for generating a computer system output signal indicative of whether or not the directional heading of the board-type sports equipment element caused by variations in pressure applied to the sports equipment element by the user are within the directional heading criteria.

26. A user interactive simulation system for simulating the performance of board-type, foot-controlled sports equipment, the simulation system comprising:

(a) variable pressure sensing means responsive to pressure applied thereto for generating a continuous control signal that varies in relation to the variations in applied pressure;

(b) processing means for processing the control signal generated by the variable pressure sensing means and information relating to physical characteristics of a selected board-type, foot-controlled sports equipment-element, wherein variations in pressure applied to the sports equipment element cause related variations in directional heading of the sports equipment element based on the physical characteristics of the sports equipment element, to generate an equipment element heading signal indicative of the variations in directional heading of the sports equipment element that would be caused by the pressure applied to the variable pressure sensing means; and (c) a motion system connected to the variable pressure sensing means and responsive to the equipment element heading signal for movement in at least one axis.

27. A user interactive simulation system for board-type, foot-controlled sports equipment, the simulation system comprising (a) a board-type sports equipment element having physical characteristics such that variations in pressure applied to the element by the user cause corresponding variations in the directional heading of the element;

(b) variable pressure sensing means underlying the board-type sports equipment element and responsive to variations in pressure applied thereto for generating a continuous control signal that varies in proportion to the variations in pressure applied to the element by the user; and (c) a computer system that includes:
(i) storage means for storing information that defines directional heading criteria of the board-type sports equipment element;
(ii) processing means for processing the control signal generated by the variable pressure sensing means to determine whether he variations in directional heading of the board-type sports equipment element caused by variations in pressure applied to the element by the user are within the defined directional heading criteria; and
(iii) means for generating a computer system output signal that varies in correspondence to the magnitude of deviations of the directional heading of the board-type sports equipment element caused by variations in pressure applied to the element by the user and the defined directional heading criteria;

(d) a motion system connected to the board-type sports equipment element and responsive to the computer system output signal for simulating motion in at least one axis.

28. A user interactive simulation system as in claim 27 wherein the board-type sports equipment element comprises first and second foot-controlled members.

29. A system for monitoring the simulated performance of a user of board-type foot-controlled sports equipment, the system comprising:

(a) variable pressure sensing means responsive to variations in pressure applied thereto for generating a continuous control signal that varies in relation to the variations in applied pressure;
(b) processing means for processing the control signal generated by the variable pressure sensing means and information relating to physical characteristics of a selected board-type, foot-controlled sports equipment element, wherein variations in pressure applied to the sports equipment element cause related variations in directional heading of the sports equipment element based on the physical characteristics of the sports equipment element, to generate an equipment element heading signal indicative of the variations in directional heading of the sports equipment element that would be caused by the pressure applied to the variable pressure sensing means; and
(c) means responsive to the equipment element heading signal.

30. A system as in claim 29 wherein the sports equipment element comprises at least one ski and the computer system comprises means or calculating deflection and carving radius of the at least one ski in response to the control signal.

31. A system as in claim 30 wherein the computer system further comprises means for calculating edging and fore-to-aft pressure leaverage adjustments on the carving radius of the at least one ski.

32. A system as in claim 29 where the means responsive to the equipment element heading signal comprises a display unit for displaying information corresponding to the equipment element heading signal.

33. A system as in claim 32 wherein the sports equipment element comprises at least one ski and the computer system comprises instruction means for providing simulated ski instruction information to the display means in response to the control signal.

34. A system as in claim 32 wherein the display system includes means for displaying pictures and graphics in response to the equipment element heading signal.

35. A ski simulation system as in claim 34 wherein the display system includes a rastor scan cathode system.

36. A ski simulation system as in claim 34 wherein the display system includes a vector graphic system.

37. A ski simulation system as in claim 34 wherein the display system includes means for generating a display for free skiing and racing.

38. A ski simulation system as in claim 37 wherein the display generated comprises a display of ski tips from a skier's perspective.

39. A ski simulation system as in claim 34 wherein the display system includes means for generating a display for instructional use.

40. A ski simulation system as in claim 39 wherein the display includes at least the entire length and image of a skier's skis.

41. A ski simulation system as in claim 39 wherein the display system includes means for displaying an instructor for the user to follow.

42. A ski simulation system as in claim 41 wherein the means for displaying an instructor includes means for displaying an instructional path to be followed by the displayed instructor.

43. A ski simulation system as in claim 41 wherein the instructional display includes means for superimposing on the displayed instructor a selected ski technique.

44. A ski simulation system as in claim 41 wherein the computer system includes an audio and video storage and transmission device.

45. A ski simulation system as in claim 41 wherein the audio and video storage and transmission device comprises a laser disc and recorder.

46. A ski simulation system as in claim 44 wherein the audio and video storage and transmission device comprises a digital disc and recorder.

* * * * *

UNITED STATES PATENT AND TRADEMARK OFFICE
CERTIFICATE OF CORRECTION

PATENT NO. : 5,049,079

DATED : Sept. 17, 1991

INVENTOR(S) : Matthew P. Furtado and John H. Peterson

It is certified that error appears in the above - identified patent and that said Letters Patent is hereby corrected as shown below:

On the Title Page, Item 73, delete"John H. Peterson, San Francisco, Calif." and insert --Matthew P. Furtado, Los Altos, Calif.--.

Signed and Sealed this

Twenty-third Day of February, 1993

Attest:

STEPHEN G. KUNIN

*Attesting Officer*     *Acting Commissioner of Patents and Trademarks*